Figure 1:
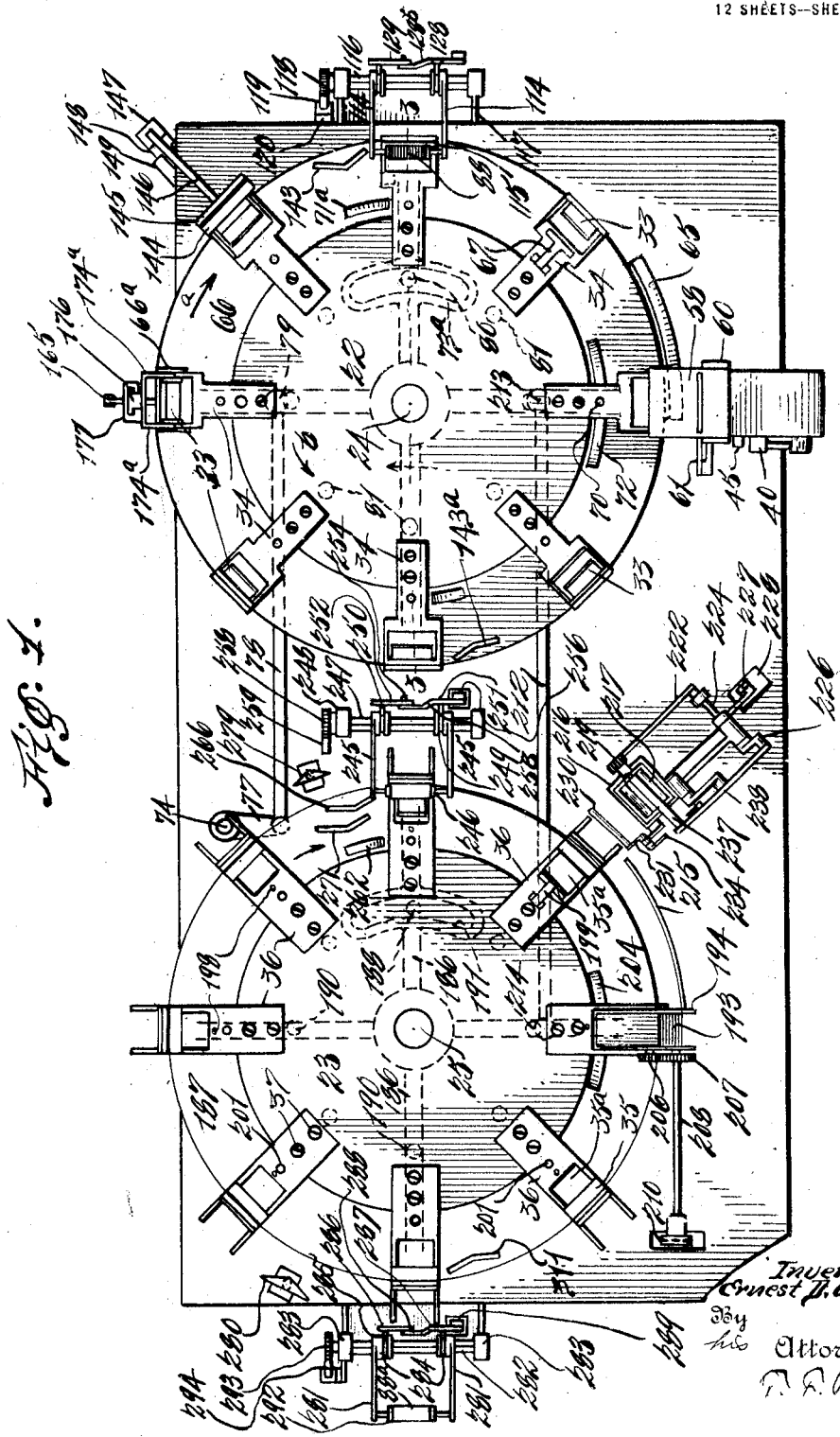

E. D. ANDERSON.
MACHINE FOR MAKING AND LABELING PACKAGES.
APPLICATION FILED MAY 19, 1917.

1,368,780. Patented Feb. 15, 1921.
12 SHEETS—SHEET 1.

Inventor:
Ernest D. Anderson
By his Attorney
T. F. Bourne

E. D. ANDERSON.
MACHINE FOR MAKING AND LABELING PACKAGES.
APPLICATION FILED MAY 19, 1917.
1,368,780.
Patented Feb. 15, 1921.
12 SHEETS—SHEET 2.
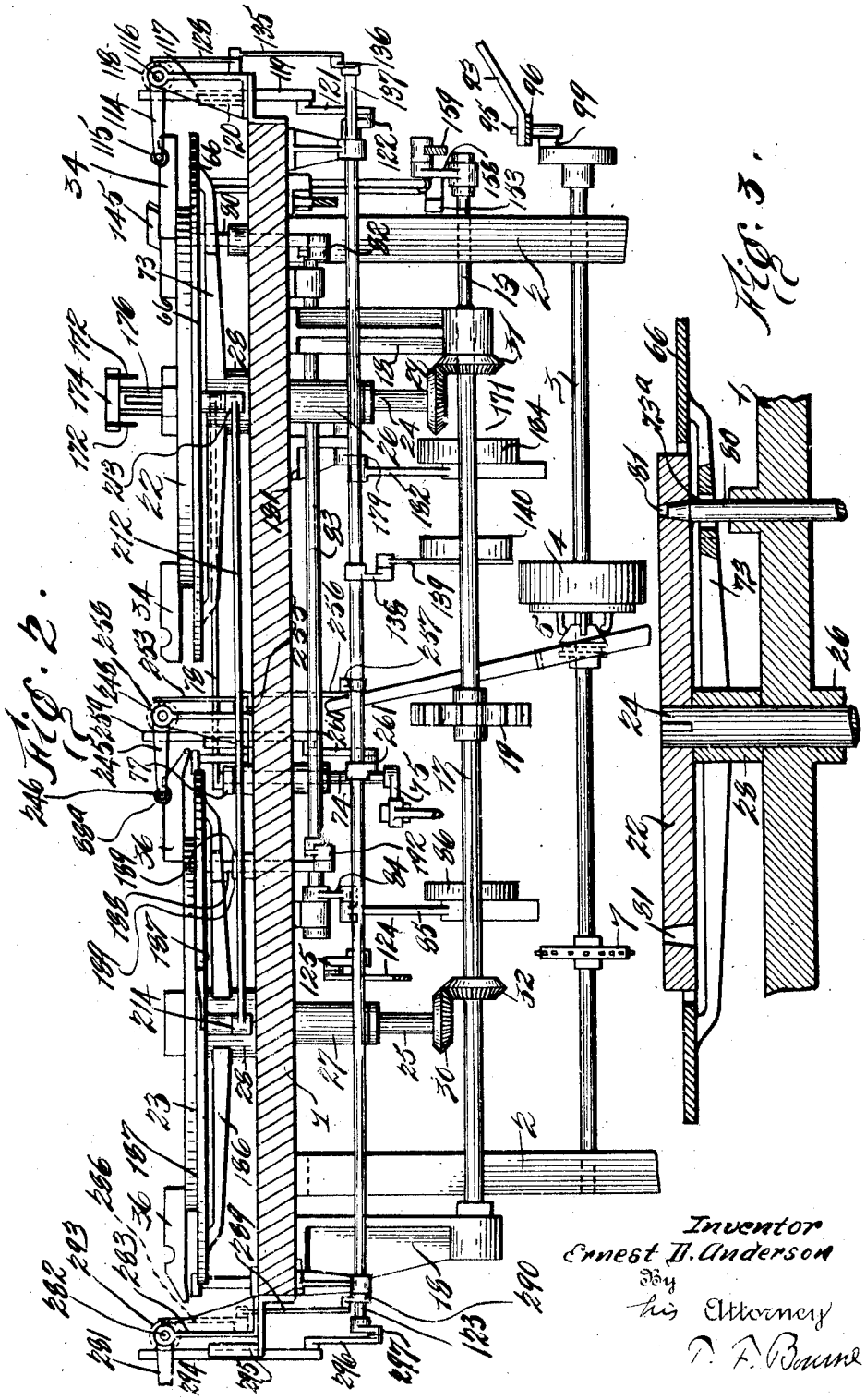

E. D. ANDERSON.
MACHINE FOR MAKING AND LABELING PACKAGES.
APPLICATION FILED MAY 19, 1917.
1,368,780.
Patented Feb. 15, 1921.
12 SHEETS—SHEET 3.
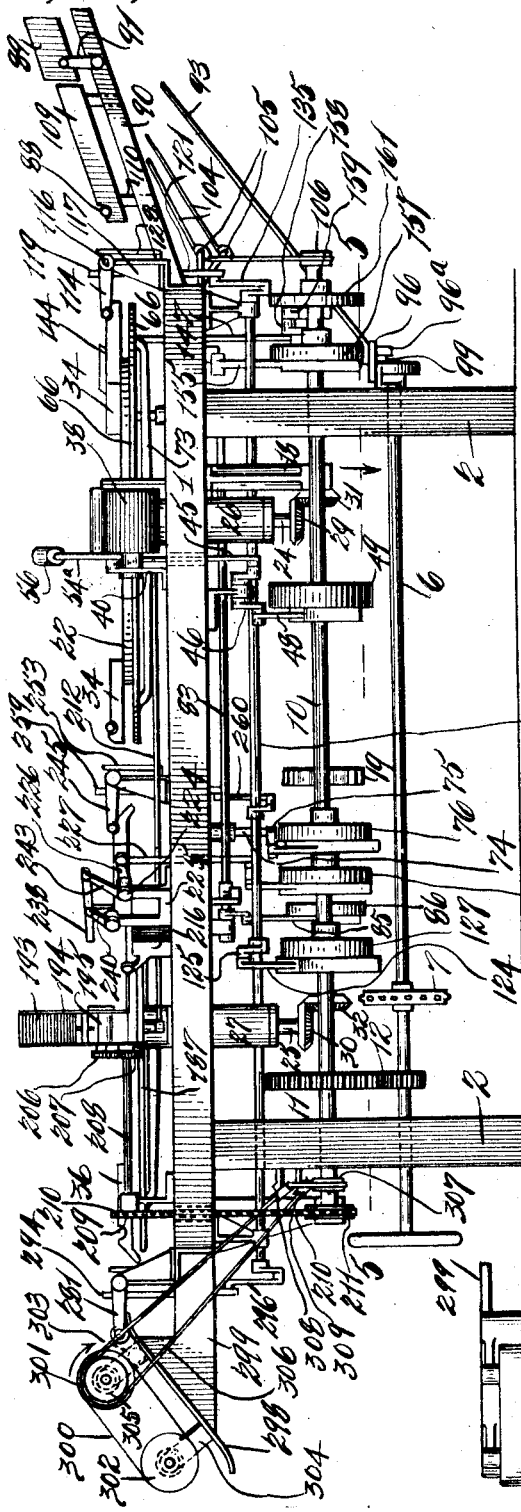
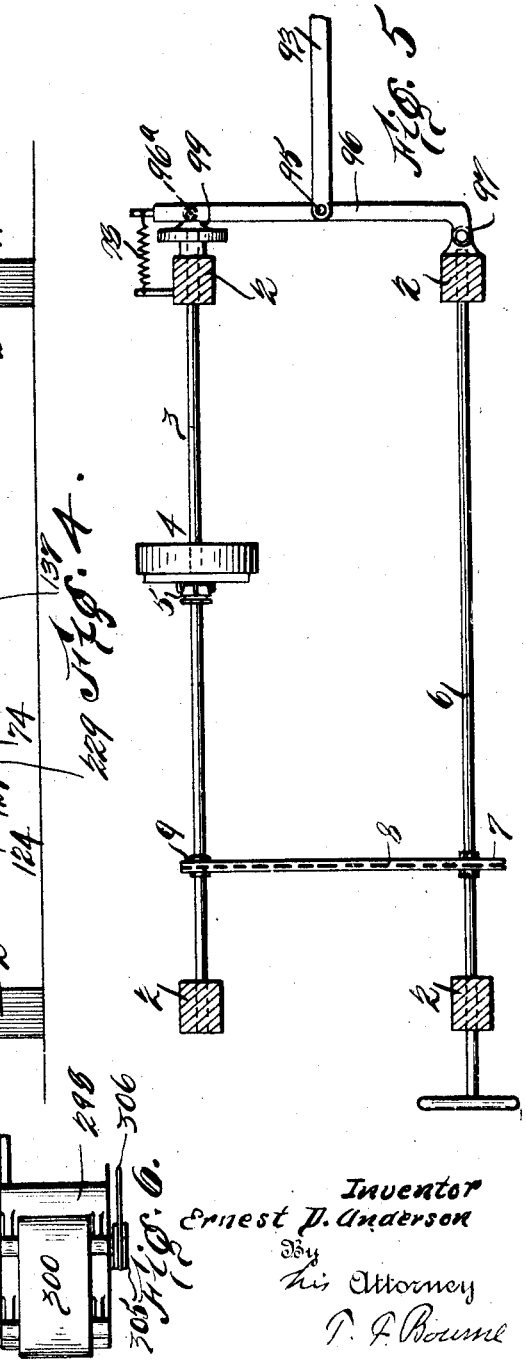
Inventor
Ernest D. Anderson
By
his Attorney
P. F. Bourne

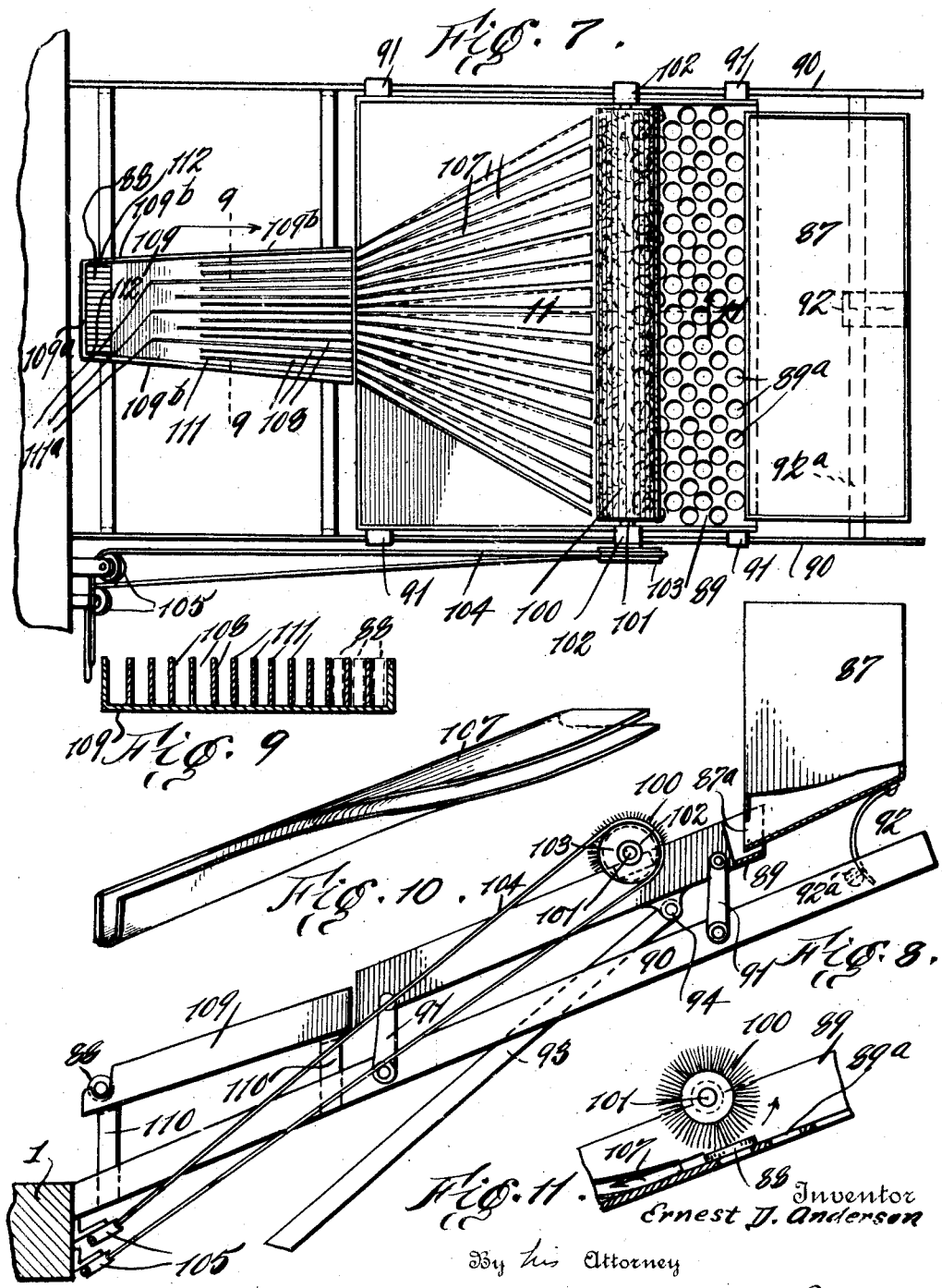

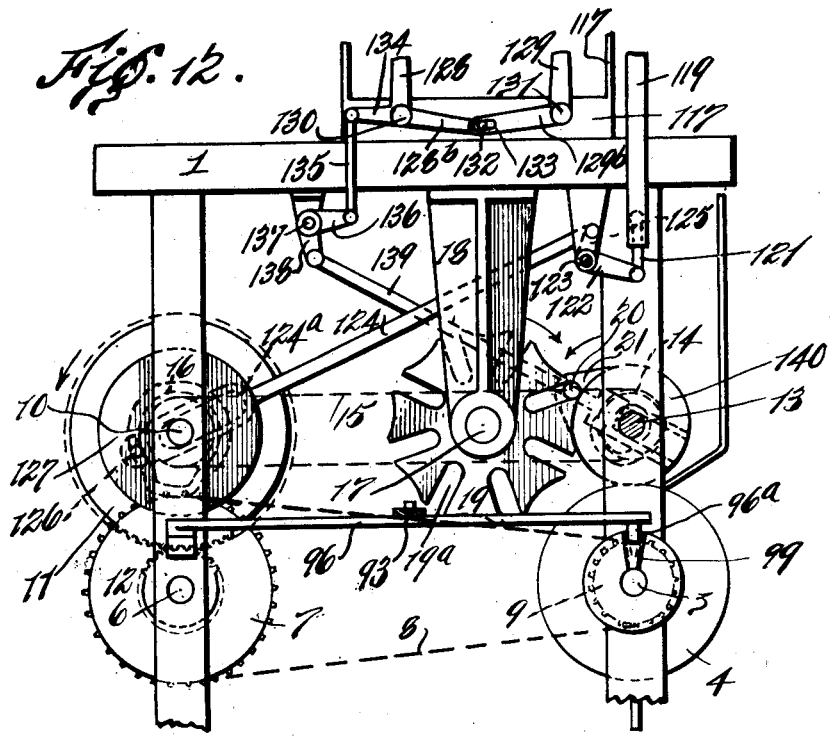

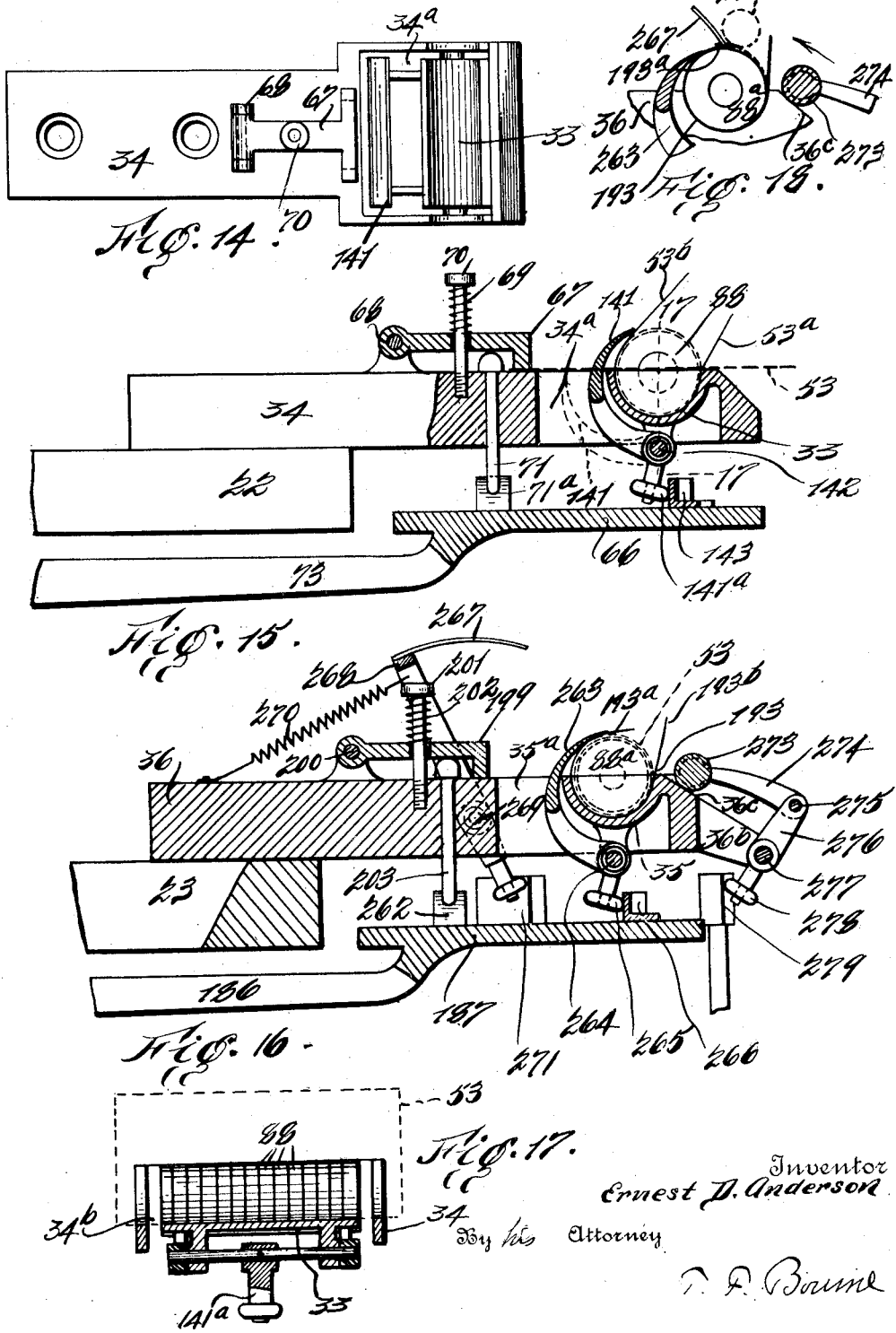

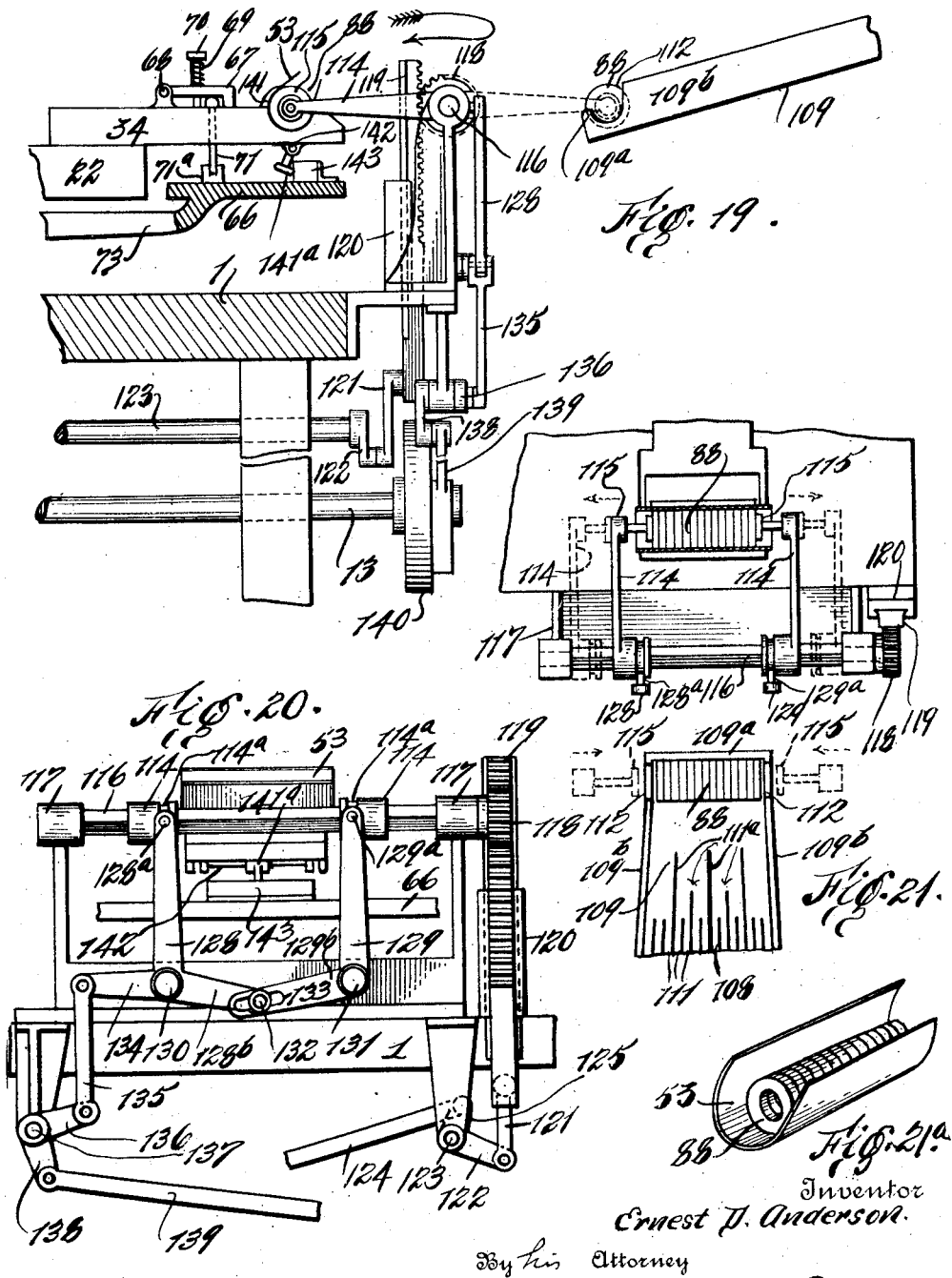

E. D. ANDERSON.
MACHINE FOR MAKING AND LABELING PACKAGES.
APPLICATION FILED MAY 19, 1917.
1,368,780.
Patented Feb. 15, 1921.
12 SHEETS—SHEET 8.
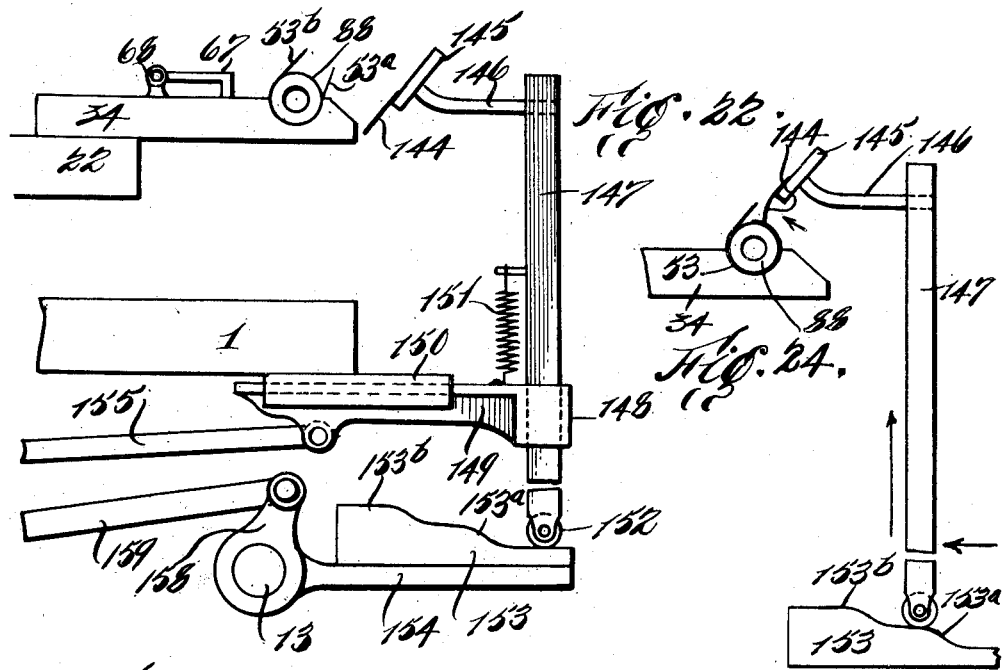
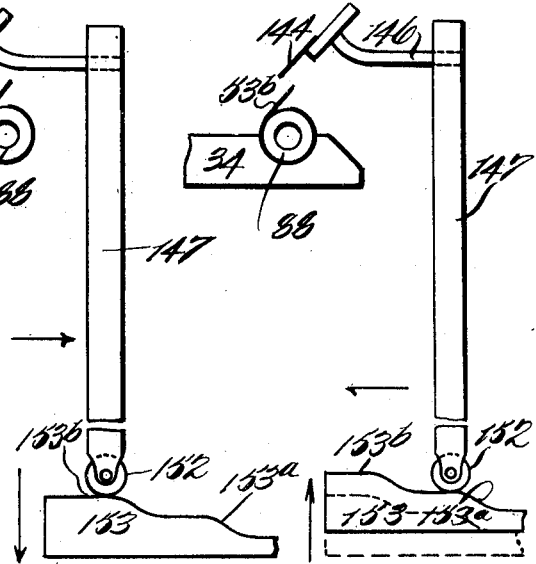
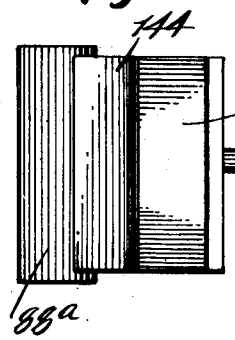
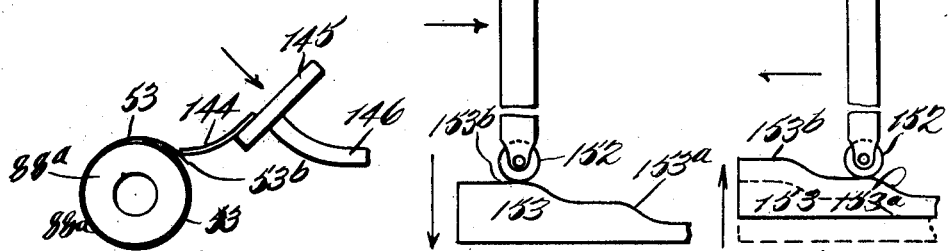
Inventor
Ernest D. Anderson
By his Attorney

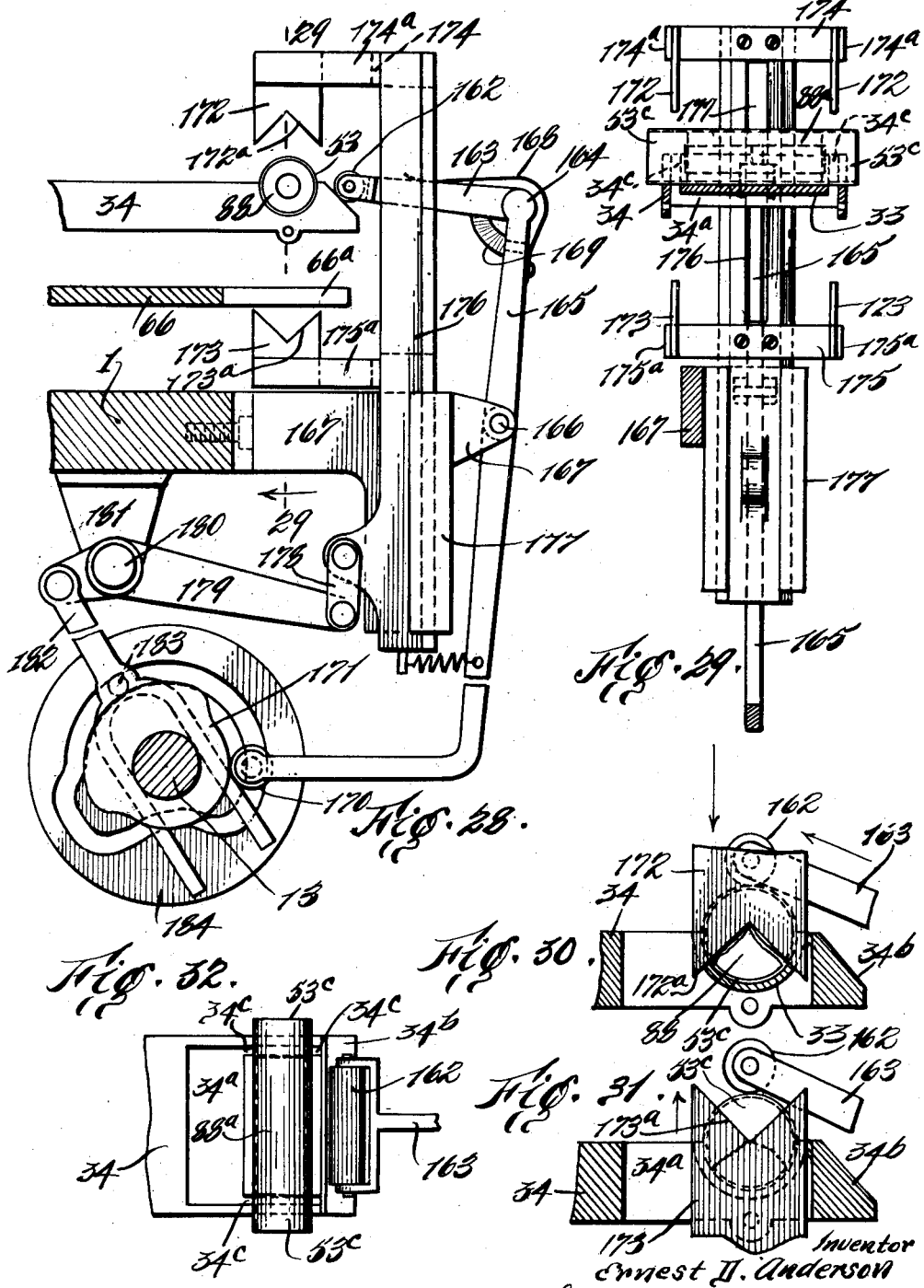

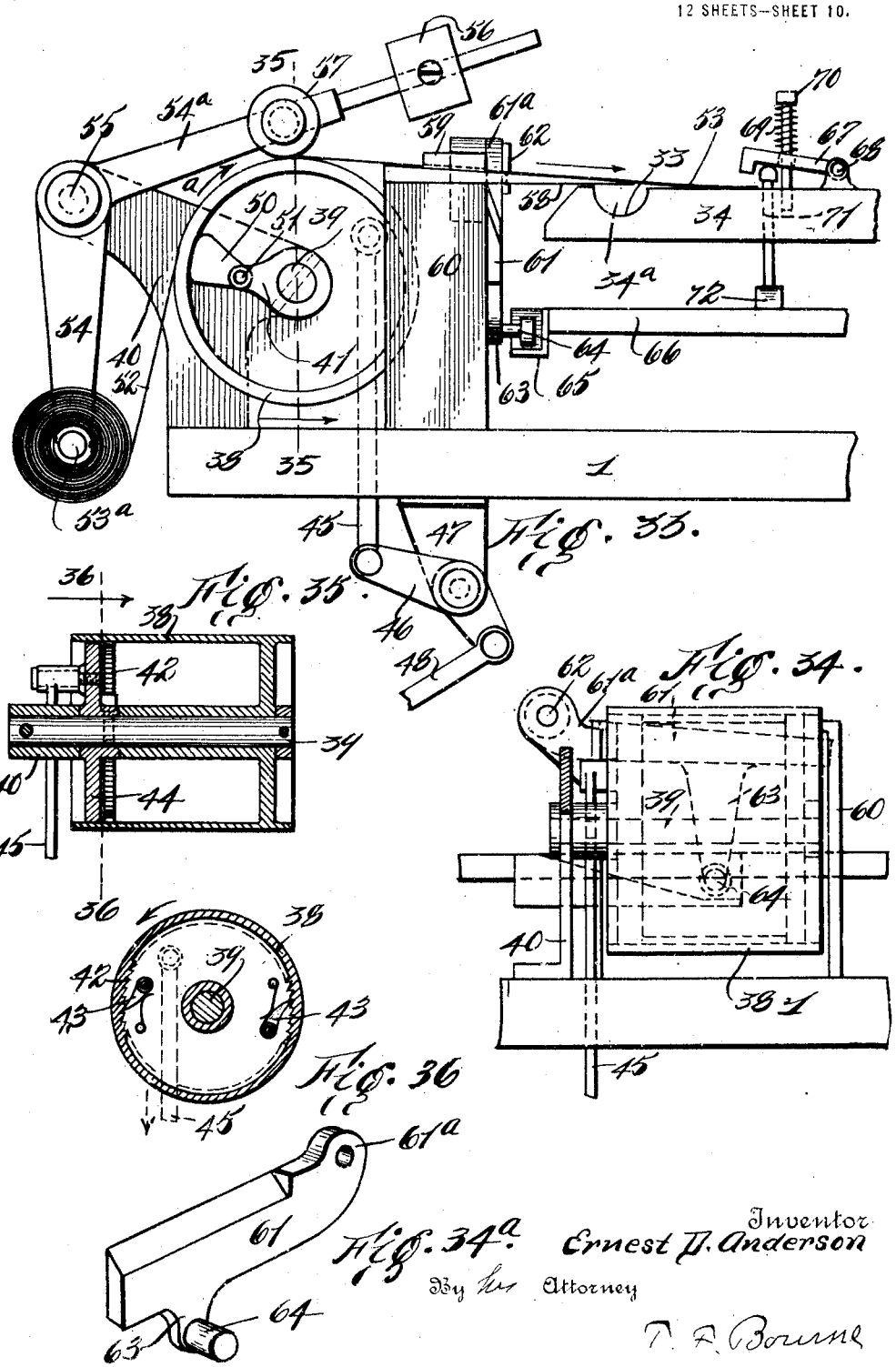

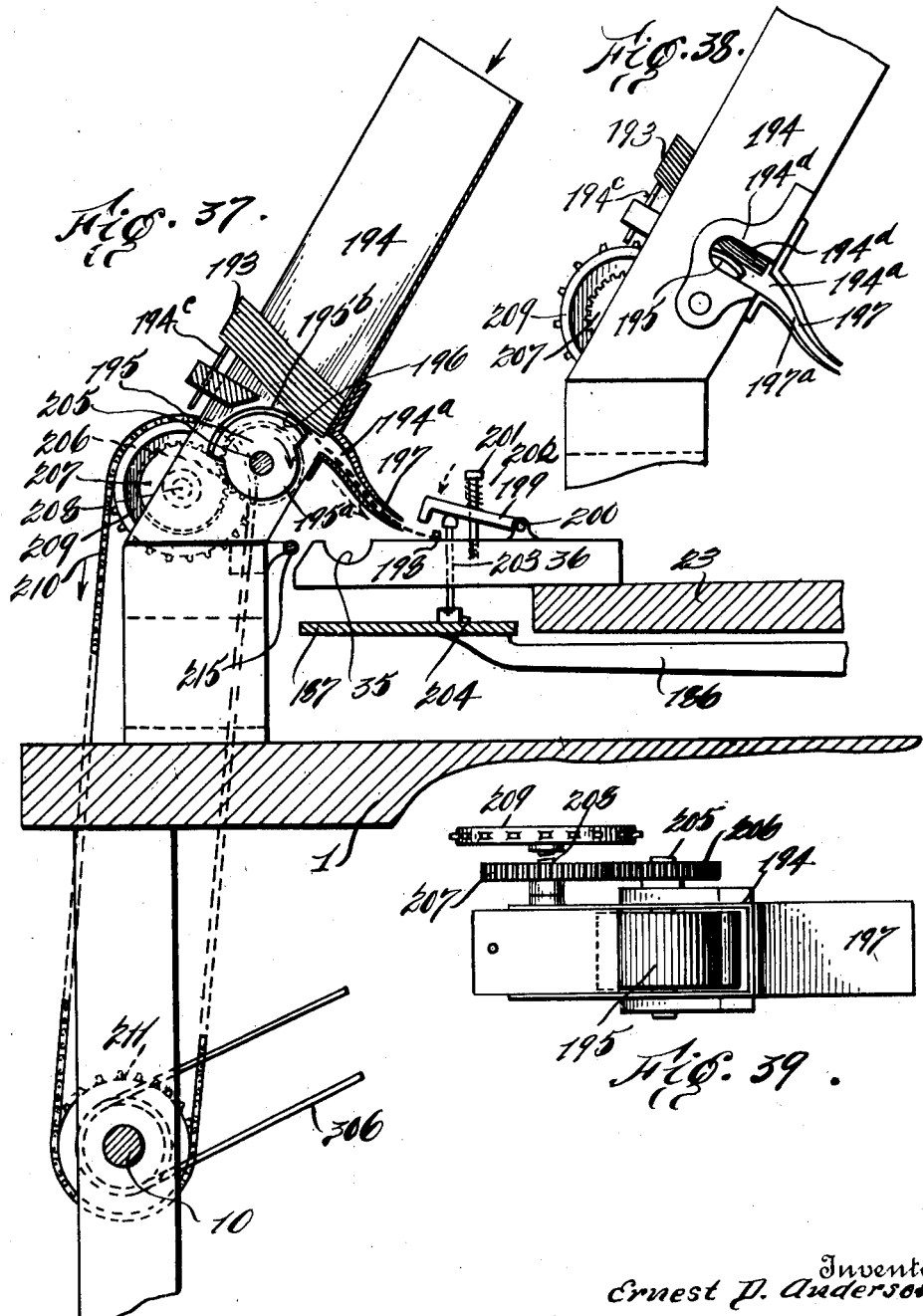

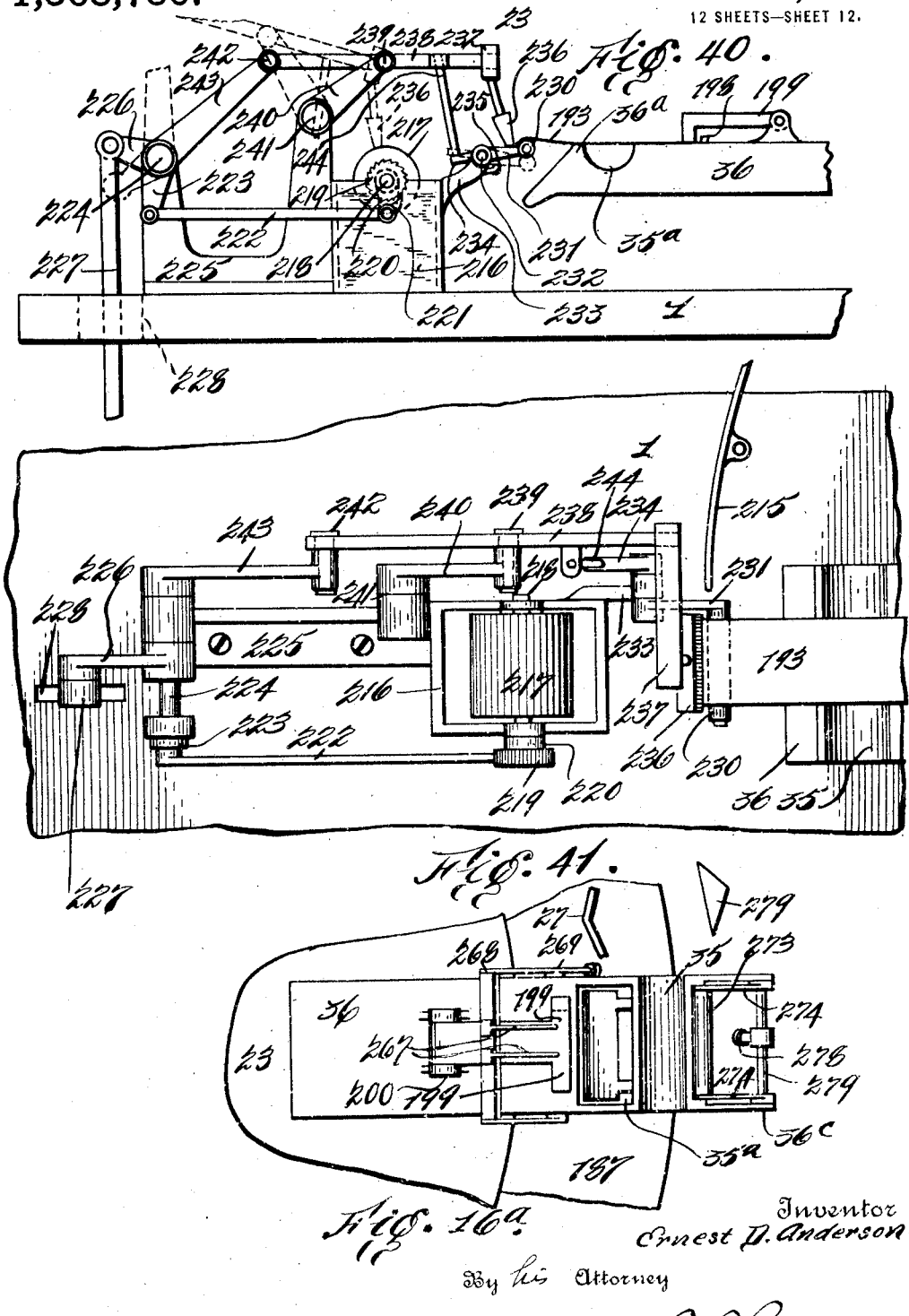

UNITED STATES PATENT OFFICE.

ERNEST D. ANDERSON, OF NEW YORK, N. Y.

MACHINE FOR MAKING AND LABELING PACKAGES.

1,368,780.

Specification of Letters Patent.

Patented Feb. 15, 1921.

Application filed May 19, 1917. Serial No. 169,679.

*To all whom it may concern:*

Be it known that I, ERNEST D. ANDERSON, a citizen of the United States, and resident of New York city, borough of Manhattan, in the county of New York and State of New York, have invented certain new and useful Iimprovements in Machines for Making and Labeling Packages, of which the following is a specification.

My invention relates to improvements in machines for automatically inclosing articles in wrappers and delivering the wrapped articles from the machine.

One of the objects of my invention is to assemble a plurality of articles side by side for each package, inclose such assembled articles in wrappers folded around the articles, and close the ends of the wrappers, a further object being to secure labels around such wrapped articles, and to deliver the wrapped and labeled packages from the machine.

In the example of my invention illustrated in the accompanying drawings, I provide means to supply wrappers, means to supply a plurality of articles for each package and to assemble said articles in position to be placed upon such wrappers, means to roll or fold the wrappers around such assembled articles for each package, means to close the ends of the wrappers, and means to deliver such wrapped articles from the wrapping devices, and I have also illustrated means to supply labels for such packages of wrapped articles, to apply paste to the labels, wrap the labels around the packages, and seal the labels thereon, together with means for delivering the labeled packages from the machine, the steps required for performing the operations above enumerated continuing successively for the several packages.

My improvements are adapted for wrapping such articles as candies in packages containing a plurality of such candies, and embodies means for selecting and feeding, for each package, a plurality of such articles or candies side by side, in position to be grasped by devices adapted to bodily move such series of articles or candies and deposit them successively upon wrappers to be folded around such series of articles, after which operations the adjacent ends of the wrappers are folded against the ends of the articles therein.

My invention further comprises novel details of improvement and combinations of parts that will be more fully hereinafter set forth and then pointed out in the claims.

Reference is to be had to the accompanying drawings forming part hereof, wherein, Figure 1 is a plan view of a machine embodying my invention, certain details being omitted; Fig. 2 is a longitudinal section of the machine; Fig, 3 is an enlarged partial detail section substantially on the line 3, 3, in Fig. 1; Fig. 4 is a side elevation of the machine; Fig. 5 is a detail skeleton view, partly in section, of parts of the machine hereinafter referred to; Fig. 6 is a detail plan view illustrating the delivery belt for the completed packages; Fig. 7 is an enlarged plan view of a magazine for articles, and means for selecting and alining the articles for the different packages; Fig. 8 is a side view of Fig. 7, partly in section; Fig. 9 is an enlarged cross section on the line 9, 9, in Fig. 7; Fig. 10 is a perspective view of one of the channel guides or members adapted for turning the articles from a horizontal to a vertical or edgewise position to be assembled for the packages; Fig. 11 is a detail section substantially on the line 11, 11, in Fig. 7; Fig. 12 is an end view of the machine looking from the righthand side of Fig. 2, parts being omitted; Fig. 13 is a similar view omitting certain parts shown in Fig. 12, but illustrating means for actuating the wrapper folding devices; Fig. 14 is an enlarged detail plan view of one of the receivers for the articles on the first turret, on which the articles are to be wrapped; Fig. 15 is an enlarged partly sectional side view of a portion of the turret and cam plate, illustrating the devices shown in Fig. 14; Fig. 16 is a partly sectional view substantially similar to Fig. 15 but illustrating devices attached to and associated with the second turret for applying labels upon packages of wrapped articles; Fig. 16ª (Sheet 12) is a plan view of Fig. 16; Fig. 17 is a cross section substantially on the line 17, 17, in Fig. 15, illustrating a plurality of articles in position to be wrapped; Fig. 18 is a substantially diagrammatic partly sectional detail view illustrating means for folding labels around packages of wrapped articles on the second turret; Fig. 19 is an enlarged, partly sectional, detail view illustrating means for depositing assembled articles in wrappers on the first turret; Fig. 20 is an end view looking from the righthand side of Fig. 19; Fig. 21 is a plan view of Fig. 19; Fig. 21ª is a perspective view illustrating the articles in the wrapper; Fig. 22 is an enlarged detail side view of wrapper folding devices; Fig. 23 is a plan view illustrating the folder for folding the wrappers; Figs. 24, 25, 26 and 27 illustrate different positions of the folder and means for operating it, for folding the wrappers around the assembled articles; Fig. 28 is a partly sectional side elevation of devices for folding or closing the wrappers at the ends of the wrapped articles; Fig. 29 is a cross section substantially on the line 29, 29, in Fig. 28; Figs. 30 and 31 are detail views illustrating operations of end folders for the wrappers; Fig. 32 is a plan view, illustrating means to hold the wrapped articles while the ends of the wrappers are being folded; Fig. 33 is an enlarged side elevation illustrating means to feed wrappers to the receivers of the first turret; Fig. 34 is an end view looking from the lefthand side of Fig. 33, parts being omitted: Fig. 34ª is a detail perspective view of the cutter or knife for cutting off the wrappers successively from a strip or web of wrapper material; Fig. 35 is a detail section substantially on the line 35, 35, in Fig. 33; Fig. 36 is a cross section substantially on the line 36, 36, in Fig. 35; Fig. 37 is an enlarged sectional view illustrating means for supplying labels and feeding them successively to the receivers of the second turret; Fig. 38 is a side elevation of the magazine illustrated in Fig. 37; Fig. 39 is a plan view of parts shown in Figs. 37 and 38. Fig. 40 is a side elevation illustrating means for applying paste to the labels; and Fig. 41 is a plan view of Fig. 40.

Similar numerals of reference indicate corresponding parts in the several views.

In the drawings the numeral 1 indicates a frame, shown in the form of a plate or table having legs 2. At 3 is a driving shaft shown provided with a loose pulley 4 for operating by a belt from a suitable prime mover, clutch devices at 5 (Figs. 2 and 5) permitting connection or disconnection of said pulley with shaft 3 as required. At 6 is a driven shaft suitably journaled upon frame 1 and shown provided with a sprocket wheel 7 receiving a chain 8 from a sprocket wheel 9 on shaft 3, whereby shaft 6 may be driven at the desired speed. At 10 is a shaft suitably journaled upon frame 1, and shown provided with a gear 11 meshing with a gear 12 secured on shaft 6, whereby shaft 10 may be driven at the desired speed (Figs. 4 and 12). At 13 is a shaft journaled upon frame 1, and having a sprocket wheel 14 receiving a chain 15 that passes over a sprocket wheel 16 on shaft 10, whereby shaft 13 may be driven. At 17 is a shaft (Figs. 2 and 12) suitably journaled in bearings upon frame 1, as upon brackets 18 thereon, which shaft is adapted to be rotated intermittently, for which purpose I have shown the member 19 of a Geneva movement secured on shaft 17 and adapted to be actuated by a projection 20 on an arm 21 carried by shaft 13. The Geneva member 19 is shown provided with eight recesses 19ª to receive projection 20, whereby shaft 17 is given eight steps for each complete rotation thereof by shaft 13. In the example illustrated, shaft 17 is adapted to rotate two spaced turrets 22 and 23 step by step, the turret 22 being provided with devices adapted for coöperation with mechanism whereby articles may be inclosed in wrappers, and the turret 23 being provided with devices adapted for coöperation with mechanism whereby such wrapped articles may be provided with or inclosed in labels, and the labels may be pasted around the wrappers and the finished packages delivered. The shafts and gearing above described provide a substantial and convenient arrangement for operating the said turrets, as well as other mechanism hereinafter described.

Said turrets 22 and 23 are respectively provided with shafts 24, 25 respectively journaled in bearings 26, 27 carried by frame 1 (Figs. 2, 3 and 4). A bushing or hub 28 may be disposed between each of the turrets and frame 1, for convenience in maintaining the turrets at desired height from the top plate of the frame and for supporting cam-plates to be described. The shafts 24, 25 are shown provided respectively with gears 29, 30, in mesh with corresponding gears 31, 32 secured on shaft 17 (Figs. 2 and 4) whereby said turrets may be rotated in the same direction, the Geneva movement before described serving to rotate said turrets simultaneously step by step. The turret 22 is provided with a plurality of spaced receivers or seats 33, shown carried by blocks 34, secured to and projecting from the turret plate, and the turret 23 is provided with substantially similar receivers or seats 35 shown carried by blocks 36, secured to and projecting from the turret plate 23, said receivers or seats 33, 35 thus being comprised in the general construction of the respective turrets. Said blocks 34, 36 are shown respectively provided with openings 34ª, 35ª to accommodate respectively wrapper and label folding members or fingers, as hereinafter described. The receivers or seats 33, 35 are shown substantially in semicircular form, as in the nature of curved plates or arms, adapted to receive the wrappers and labels respectively when the goods are deposited in the corresponding receiver, to temporarily retain goods therein. For convenience in manufacture of the turrets, blocks 34, 36 are secured upon the turret plates by means of screws 37, whereby said blocks may be removed and replaced when required.

Adjacent to turret 22 I provide means to supply wrappers over the receivers 33, as the latter are stepped around successively by the turret, means for such purpose being shown in Figs. 1, 4, and 33 to 36, as follows: A drum or roller 38 is journaled upon a rod or shaft 39, as by a bracket 40 secured upon the main frame, the drum being held from longitudinal displacement on the shaft by the bracket, and by an arm 41 on the shaft. The drum is shown provided with an annular series of internal ratchet teeth 42 adapted to be engaged by one or more spring pressed pawls 43, pivotally carried by a disk or support 44, journaled upon shaft or rod 39, said disk being reciprocated for rotating said drum in proper timed relation to the operations of the turret. I have shown said disk pivotally connected by a link 45 with a rock arm 46, journaled in bracket 47 on the main frame, and pivotally connected with a rod 48 adapted to be operated by a suitable cam 49 on shaft 10 (Fig. 4). I provide brake means to resist reverse rotation of drum 38, for which purpose I have shown a weighted arm 50 pivotally supported upon arm 41 at 51 (Fig. 33), and adapted to permit drum 38 to be fed forwardly freely in the direction of the arrow *a* (Fig. 33), and to prevent the reverse rotation of the drum. At 52 is indicated a strip of suitable material, such as tin-foil, paper or the like, from which wrappers 53 are to be cut for the successive packages of goods to be formed, said strip being shown in the form of a web or reel mounted upon a support 53ª carried by an arm 54 pivotally supported at 55 upon bracket 40 (Fig. 33). An arm 54ª projecting from arm 54, over drum 38, is shown provided with an adjustable weight 56 and with a pressure roller 57 adapted to bear upon strip 52 as it passes over drum 38 to aid in feeding the strip along the drum. The web is fed from the drum over a guide plate 58 that projects outwardly above the outer portions of the blocks 34 as they are carried around by the turret 22, to guide the outer end of web 52 over the block and over the receiver 33 thereof. The web 52 is fed between a stationary cutter 59, secured upon a support 60 on frame 1 (Fig. 33), and a reciprocative cutter 61. The projecting portion 61ª of cutter 61 is pivotally supported at 62 upon support 60. The cutter 61 is shown provided with a lug 63 carrying a projection 64 coöperative with a cam 65, suitably shaped to cause swinging or reciprocating motions of cutter 61, said cam being carried by a cam-plate 66 (Figs. 33, 34 and 36), that is located beneath the turret 22. When the cam plate oscillates, as hereinafter specified, the cam 65 will cause the knife 61 to reciprocate to cut off wrappers 53 from the web 52.

Means are provided to temporarily retain each wrapper 53, when cut off from the strip, upon corresponding block 34 over the corresponding receiver 33 thereof. For such purpose I provide wrapper retainers or clamps 67 that are respectively pivotally supported at 68 upon each of the blocks 34, and are adapted to grip, against the block, the adjacent end portion of strip 52 as fed over the block. Each retainer 67 is spring pressed toward the corresponding block 34 by a corresponding spring 69, shown abutting against a retainer and against a stop pin or screw 70 that is carried by block 34 and passes freely through a hole in the retainer, (Figs. 15 and 33). A rod or pin at 71 is freely guided in block 34 beneath retainer 67 and adapted, when pushed upwardly, to raise said retainer. The cam plate 66 is shown provided with a suitably shaped cam-like projection 72 (Fig. 1) adapted to coöperate successively with the pins 71, whereby when the cam plate is moved a pin 71 will be correspondingly actuated to cause raising and lowering of the adjacent retainer 67. The arrangement is such that as the turret steps a block 34 toward the wrapper receiving position the corresponding pin 71 will encounter cam 72 and cause the corresponding retainer 67 to rise to permit the passage of the outer end of strip 52 thereunder, and then when the cam plate is next operated said cam will pass from under said pin which will allow the retainer to be pushed down by spring 69 to grip the end of the strip, and thereupon cam 65 will operate the cutter or knife 61 to cut off the projecting portion of the strip to form the wrapper 53, and so on successively as each block 34 is presented to the wrapper receiving position (Fig. 33).

The cam plate 66 is rotatively supported below turret 22, for which purpose I have shown said cam-plate carried by arms 73 projecting from hub 28, whereby the cam plate is mounted concentric with respect to turret plate 22. I have shown means to oscillate the cam plate arranged as follows: A shaft 74 (Figs. 1, 2 and 4), suitably journaled upon the main frame, is provided with an arm 75 adapted to be rocked by a cam 76 secured on shaft 10, and said shaft 74 above the top plate of the main frame is shown provided with a crank arm 77 (Fig. 1), pivotally connected by a link 78 with an arm of the cam plate at 79, whereby when shaft 74 is rocked the cam plate will be correspondingly rocked or oscillated, and thereby the cams 65 and 72, carried by the cam plate, will be correspondingly oscillated. I also provide means to retain the turret 22 in set position after each step given to it by the Geneva movement, for which purpose I have shown a pin or the like 80 guided in a suitable hole or bearing in the top plate of main frame 1, (Figs. 1, 2, 3 and 4), which pin is adapted to enter holes 81 in turret 22, which holes correspond to the several blocks 34. In Fig. 1 pin 80 is shown operative in an arcuate slot 73$^a$ in one of the arms 73 of the cam plate 66. The pin 80 is pivotally connected with a crank arm 82 secured upon a shaft 83 journaled in bearings upon the main frame, which shaft is shown provided with a crank arm 84 (Fig. 2) operatively connected with a rod or pitman 85 adapted to be operated by a suitable cam 86 secured on shaft 13, the timing of such parts being such that each time the turret is brought to rest at the termination of a step the pin 80 will enter a hole 81 of the turret to retain it in set position, and just before the turret is to be stepped forwardly the pin 80 will be withdrawn from the turret. The application of the wrapper upon the block 34 of the turret may be termed the first operation.

After a wrapper has been cut off from strip 52 and held by retainer 67 the Geneva movement causes the turret to be stepped around, in the direction of the arrow $b$ in Fig. 1, and brought to rest. Spaced at a suitable distance around the turret from the wrapper supplying devices, are located means to supply articles or goods to be wrapped, and the placing of the articles upon the wrappers may be termed the second operation. In the example illustrated in the drawings said article supplying devices are located in position corresponding to the second step of the turret from the wrapper supplying position (Fig. 1). The devices I have shown for supplying the articles to be wrapped, and for placing said articles upon the wrappers held upon the adjacent blocks 34 over corresponding receivers 33, are shown in Figs. 1, 2, 4, 7 to 11, 12, 14, 15 and 17 to 21, and may be described as follows: A suitable hopper 87, adapted to contain articles 88 to be wrapped, has a lower discharge opening 87$^a$ which leads to a chute or guide 89 (Figs. 4, 7, 8 and 11). Said hopper and chute are shown carried upon arms or supports 90 projecting from main frame 1, in an upward angular direction. I provide means to movably support the hopper and chute and to jar or intermittently agitate the same to cause agitation of the articles in the hopper and chute, for which purpose I have shown arms 91 at opposite sides of the chute pivotally supported upon the supports 90 and pivotally supporting the chute, and I have shown resilient arm 92 (Fig. 8) supporting the hopper upon a rod 92$^a$ carried by the supports 90. A rod or link 93 is shown pivotally connected with chute 89 at 94, the lower end of which rod is shown pivotally connected at 95 with an arm 96 that is shown pivotally supported upon a leg 2 at 97 (Figs. 2, 5 and 8). A spring 98 connected with said arm 96 and with a leg 2 serves normally to draw said arm toward a cam 99 that is secured upon shaft 3 and adapted to engage a projection 96$^a$ on arm 96, whereby, as shaft 3 rotates, the arm 96 will be rocked and thereby rod 93 will be reciprocated to correspondingly reciprocate or agitate the hopper 87 and chute 89 for the purpose of agitating the articles 88 to deliver them from hopper 87 to chute 89 and to spread out and move on the latter. In the example illustrated, articles 88 are in disk-like form, shown having a hole therein, corresponding to the confection called "Life Savers" now on the market. Since the chute is inclined from the hopper downwardly in the direction of the turret 22 the articles 88 not only will spread out on the chute, but will be caused to slide downwardly along the chute by reason of the agitation thereof. A portion of the bottom of the chute, shown immediately below the hopper, is preferably perforated at 89$^a$ (Figs. 7 and 11) to permit the escape from the chute of particles, broken pieces, etc., carried along with the articles delivered from the hopper. In order to array the articles 88 upon the bottom of the hopper in a flatwise spread-out condition and to brush off particles of dust and the like from the articles or candies, I provide a rotative brush 100 whose shaft 101 is journaled in suitable bearings 102 on the hopper, the brush being in such position as to permit only a single layer of articles 88 to pass thereunder at a time, the rotation of the brush serving to keep back articles that may be spread upon one another. A pulley 103 is shown secured to shaft 101, and receives a belt 104 that passes over guide pulleys 105 carried by frame 1, said belt being driven by a pulley 106, shown secured on shaft 10 (Figs. 4, 7 and 8) whereby the brush may be continuously rotated. Since the brush is carried by the chute it will partake of the motions of the latter, and the slack of the belt will accommodate such motions.

A desired number of the articles 88 are to be assembled side by side for each package thereof, and successive series of such articles are to be picked up and deposited upon successive wrappers 53. I provide means whereby the articles 88, although delivered flatwise upon chute 89, will be caused to turn edgewise, for assembly side by side, for each package thereof to be formed. In the example illustrated means are provided for assembling fourteen articles 88, side by side, for each package. For the purpose stated, I provide the bottom of chute 89 with a series of spaced downwardly converging guides 107, shaped to receive the articles 88 in a flatwise position as they pass from under brush 100, and to turn said articles edgewise as they pass through such guides (Figs. 7 and 10). Said guides may be made of suitable sheet metal in channel-like form, flattened at the receiving ends and suitably twisted between the receiving and delivering ends, so that the delivering ends will be vertical, whereby as the articles 88 traverse said guides the articles will be caused to turn to an edgewise position. Since the articles 88 when spread out flatwise on the chute extend for a greater width than when collected together on edge, and in order to assemble said articles side by side on edge, guideways 107 converge from their receiving ends toward their delivery ends, as illustrated in Fig. 7, and are secured to the bottom of the chute. The delivery ends of guides 107 are shown opposing vertically disposed channels 108 in a supplemental chute 109 shown supported by uprights 110 upon the arms 90 (Figs. 4, 7, 8 and 9). Said channels may be formed by suitably spaced walls or strips 111, within supplemental chute 109, which strips or walls are shown converging toward the delivery end of the supplemental chute, the upper ends of the channels 108 registering with the delivery ends of guides 107, whereby the articles 88 that roll from the guides 107 will roll into corresponding channels 108. The lower wall 109$^a$ of chute 109 obstructs the lowermost series of articles 88 and retains them in position to be picked up, and the side walls 109$^b$ of supplemental chute 109 converge toward end wall 109$^a$ and guide the succeeding series of articles 88 to wall 109$^a$. I have shown several of the strips or walls 111, such as five of such walls indicated at 111$^a$, extended beyond the delivery ends of other walls 111 (Fig. 7), whereby several articles 88 emerging from the shorter walls 111 will be temporarily retained by longer portions 111$^a$ of the corresponding walls, to aid in the assembly of succeeding series of articles 88 side by side, and prevent them from tilting, as they travel toward the lower end of chute 109.

When a series of articles 88 has been assembled at the lower end of supplemental chute 109, against the wall 109$^a$, such articles will oppose recesses 112 in the side walls 109$^b$ of said chute, in position to be grasped by a pair of spaced lifters or grippers 114. The lifters or grippers 114 are carried by frame 1 opposing and at a suitable distance from the lower end of supplemental chute 109, and their outer ends are shown provided with pads 115 (Figs. 1 and 21), while their inner ends are slidably mounted upon a polygonal shaft 116, whereby said lifters may slide on and will be rocked or rotated with said shaft, although said lifters may be otherwise mounted upon said shaft for such purposes. Shaft 116 is shown journaled at its ends in bearings upon bracket 117 carried by frame 1, and means are provided to rock said shaft to swing the outer ends of said lifters to the article receiving position at the lower end of chute 109 and to the article delivering position over the successive wrappers 53 carried by blocks 34 of turret 22, and vice versa. For such purpose I have shown a pinion 118 secured on shaft 116 and in mesh with a reciprocative rack 119, shown vertically disposed and guided in a way 120 carried by frame 1 (Figs. 1, 2, 4, 19, 20 and 21). The rack 119 may be reciprocated in proper time by any suitable means, for which purpose I have shown a link 121 pivotally connected with said rack and pivotally connected with a crank arm 122 that is secured upon shaft 123 journaled in suitable bearings upon the main frame. Shaft 123 is to be rocked in proper timing, and for such purpose I have shown a rod 124 pivotally connected with a crank arm 125 secured on shaft 123, said rod having a slotted end 124$^a$ (Fig. 12) receiving and guided by shaft 10, the rod having a projection 126 coöperative with a cam 127 secured on said shaft (Figs. 2, 4 and 12), whereby shaft 123 may be rocked and thereby rack 119 will be reciprocated to cause proper rocking of lifters 114. Means are provided to cause the lifters 114 to approach each other to grip a series of articles 88 at the delivery end of chute 109, whereby to grasp and lift such articles and to carry them bodily over and deposit them upon wrapper 53, retained on block 34 of turret 22, and then to separate to leave said assembled articles deposited in the wrapper in receiver or seat 33 of the turret, the lifters next being swung back to grasp a succeeding series of articles 88 to deposit them on a succeeding wrapper, and so on. For such purpose I have shown crank arms 128, 129 that are shown respectively pivoted at 130, 131 on bracket 117, which arms are shown provided respectively with projections 128$^a$ and 129$^a$ respectively entering grooves 114$^a$ in the hubs of lifters 114 (Figs. 1, 2, 4, 12, 19, 20 and 21). The arms 128, 129 are operatively connected together, for which purpose I have shown portion 128$^b$ of arm 128 provided with a pin or projection 132 received in a slot 133 in portion 129$^b$ of arm 129, whereby said arms may rock toward and away from each other, to correspondingly move the lifters 114 along shaft 116 (Figs 12 and 20). Crank arm 134 extending from arm 128 is shown pivotally connected by a link 135 with a crank arm 136 secured upon a shaft 137 journaled upon frame 1. The crank arm 138 secured on shaft 137 (Figs. 2 and 12) is pivotally connected with a rod 139 shown having a forked end guided by shaft 13 and provided with a projection coöperative with cam 140 on said shaft, whereby shaft 137 will be rocked. The relative arrangement of the parts is such that when a wrapper 53 has been severed from strip 52 and placed upon a block 34 over its receiver 33, and held by the retainer 67, the turret 22 will be brought to rest with said turret and wrapper in operative relation to the lifters 114. The wrapper 53 extending over receiver 33, is indicated in dotted lines in Fig. 15. Thereupon cam plate 66 will operate to cause a cam 71ª thereon to operate pin 71 to cause retainer 67 to rise from the wrapper to release it (Figs. 1 and 15), and rack 119 will have caused lifters 114 to be swung outwardly from the turret to stop respectively at opposite ends of the series of articles 88 at the end of chute 109 (Fig. 19). While the lifters are in such position (see dotted lines in Fig. 19), the link 135 will be operated to cause the upper ends of arms 128, 129 to swing toward each other, to correspondingly move the lifters 114 toward articles 88 and the pads 115 will engage such articles. Said lifters will temporarily be retained in the last named adjusted positions gripping the articles between them, and thereupon rack 119 will again operate reversely to cause the lifters 114 to be swung over toward the turret, carrying a series of articles 88 between them, and another series of such articles will roll down chute 109 to take the place of the articles 88 removed therefrom. As the lifters 114 approach the block 34 they will deposit the articles 88 upon the wrapper 53, depressing the same into the receiver or seat 33, and the edge portions of the wrapper will project outwardly, substantially as shown in full lines in Fig. 15, and thereupon link 135 will again operate to cause the lifters 114 to spread apart to release the articles 88 in receiver 33 upon wrapper 53, and rack 119 will again operate to rotate the lifters back toward chute 109 for another supply of articles, 88, and so on for succeeding packages to be formed.

After the wrapper 53 has been seated in receiver 33 on the turret the wrapper is to be folded around the articles, and to temporarily retain the left hand projecting portion 53ᵇ of the wrapper (Fig. 15) extending outwardly I provide the block 34 with a rocking finger 141 pivotally supported upon a shaft 142 carried by block 34 beneath receiver 33, which finger is normally retained away from the wrapper by its weight, as in dotted lines in Fig. 15. After the articles 88 have been deposited in the wrapper, the cam plate 66 will operate, in an appropriate direction (in the direction of arrow a in Fig. 1), to cause a cam 143 thereon to engage a projection or roller 141ª connected with finger 141 to cause said finger to swing up to temporarily retain the wrapper against the articles 88, (Figs. 15, 19 and 20).

The wrappers 53 may be of tin foil, and will remain substantially in set position, so that when the turret 22 is next moved from the article receiving position and is brought to rest the projecting ends of the wrapper will be in position to be finally folded around the articles 88 therein, which may be termed a third operation. Means for folding the wrappers around the articles 88 are shown in Figs. 1 and 22 to 27 arranged as follows: A wrapper folder 144, which is preferably a piece of suitable flexible material, is carried upon a head 145, shown supported by an arm 146 projecting from a rod, bar or the like 147 guided to reciprocate in a bearing 148 movably supported by frame 1 (Figs. 1 and 22). The bearing 148 is shown provided on a slidable block 149 carried by a guide 150, secured upon frame 1, (Figs. 13 and 22), so that the rod 147 may be moved laterally. A spring 151 (Fig. 22) is shown connecting rod 147 with block 149 for normally drawing the rod and the wrapper folder 144 downwardly. The lower end of rod 147 is shown provided with a roller 152 adapted to coact with a suitably shaped movable cam-like member 153 that is shown carried by an arm 154, which may be loosely journaled on shaft 13 or rockably supported in any suitable manner on the main frame. The bearing 148 may be reciprocated and the cam 153 may be rocked, in suitable timed relation to each other and to other parts, by any suitable means. I have shown block 149 pivotally connected with a rod 155 (Figs. 2, 13 and 22), the outer end of which rod is shown forked and guided upon shaft 10, which rod is shown provided with a projection 156 adapted to be oscillated by a cam 157 secured on shaft 10 (Figs. 4 and 13), for reciprocating the bearing 148. A crank arm 158, connected with arm 154, is shown pivotally connected with rod 159 (Figs. 2, 4, 13 and 22), which rod is shown having a forked end guided upon shaft 10, said rod being shown provided with a projection 160 coöperative with a cam 161, secured on shaft 10, whereby the arm 154 and cam 153 may be rocked. The arrangement of parts described is such that when the turret 22 is brought to rest opposite folder 144, with a series of articles 88 resting in a wrapper 53 in receiver 33, of the turret, the folder 144 will be in a depressed position at a suitable distance from the nearest projecting portion 53ª of the wrapper, substantially as indicated in Fig. 22, the bearing 148 then being projected outwardly from the turret and roller 152 being upon the low part of cam 153. While the turret is at rest the rod 155 will be operated to draw block 149, bearing 148, and rod 147 toward the turret, and roller 152 will then ride up on the raised portion 153ª of cam 153 to a position substantially as indicated in Fig. 24, whereupon the folder 144 will be caused to engage the projecting portion 53ª of wrapper 53 to wind or lay the same around the articles 88, substantially as indicated in said figure. The bearing 148 continues to move inwardly to cause bar 147 and folder 144 to move to the left, and rod 159 is actuated to cause cam 153 to rise, while bar 147 moves to the left, to raise the folder over the partly formed package, above the projecting portion 53ᵇ of the wrapper (Fig. 25). The folder comes to rest above and behind such portion of the wrapper, substantially to the position shown in Fig. 26, the roller 152 then resting upon the high part 153ᵇ of cam 153. Bearing 148 is next actuated to move the folder 144 and bar 147 outwardly, and roller 152 then rides downwardly along cam 153 from the high part 153ᵇ thereof, while said cam is being gradually lowered, whereupon folder 144 will engage the then projecting portion 53ᵇ of the wrapper and cause the same to be folded down over the first folded portion 53ª of the wrapper, substantially as indicated in Fig. 27, the bearing 148 and bar 147 continuing to be moved outwardly along cam 153 while the latter is lowered until said parts are restored to normal position and come to rest (Fig. 22). Such operations for folding the wrapper around a series of articles or candies occur each time after turret 22 comes to rest and may be termed the third operation. The package 88ª (Figs. 23 and 27) is thus partly formed, with the ends 53ᶜ of the wrapper projected outwardly beyond the articles 88.

I provide means to close or fold the projecting end portions of the wrapper of the partially completed package upon a subsequent step of turret 22, which may be termed the fourth operation. Devices for such purpose are shown located in position corresponding to the next stopping point or step of turret 22, (Fig. 1). To retain the partially formed package in receiver or seat 33 of the turret, with the projecting end portions 53ᶜ of the wrapper extending beyond the corresponding sides of said receiver (Fig. 32), I provide a retainer 162, shown in the form of a roller pivotally mounted upon an arm 163 that is pivotally carried at 164 on a rocking lever 165, which is shown pivotally supported at 166 on a bracket 167 secured upon frame 1 (Figs. 1, and 28 to 32). The arm 163 is shown normally pressed downwardly by spring 168 carried by lever 165, a stop 169 on said lever limiting the downward movement of said arm and the retainer 162. The outer edges of the turret blocks 34 are shown downwardly and outwardly inclined at 34ᵇ, whereby retainer 162 may roll up along such edges to rest upon the partly formed package, while the end portions 53ᶜ of the wrapper are being folded (Figs. 30 and 31). Lever 165 is shown provided with a roller 170 adapted to coöperate with a cam 171, secured on shaft 13 (Figs. 2 and 28), whereby said lever may be rocked to advance the retainer 162 over the partly formed package, and to withdraw the retainer therefrom in proper timed relation to the movements of turret 22. At 172, 173 are folders or closers for the projecting portions 53ᶜ of the wrapper, which folders are suitably spaced apart on opposite sides of, or above and below, the wrapper in its position of rest, to be moved relatively to the wrapper to fold or close its projecting end portions 53ᶜ. I have shown pairs of folders 172, 173 correspondingly spaced apart (Fig. 29), to engage the projecting portions of the wrapper at opposite ends of the partially completed package. The folders 172 are shown carried by a transverse arm 174 having forwardly projecting portions 174ª to which latter the folders 172 are respectively secured (Figs. 1, 2, 28 and 29), and the folders 173 are shown carried by a transverse arm 175 having forwardly projecting portions 175ª to which the folders 173 are respectively secured. Arms 174 and 175 are carried by a reciprocative bar 176 shown provided with a vertical slot 177 through which the arm 163 is adapted to operate. The bar 176 is supported in the guide or bearing 177 shown carried by bracket 167. A link 178 is shown pivotally connected with bar 176 and with a rock arm or lever 179 that is pivotally supported at 180 upon a bracket 181 carried by frame 1, the opposite end of which arm or lever is shown pivotally connected with a rod 182 shown having a forked end guided upon shaft 13 (Figs. 2 and 28). The rod 182 is shown provided with a projection 183 coöperative with a cam 184 secured on shaft 13, whereby as said cam rotates the arm or lever 179 will be rocked to cause reciprocation of bar 176 and folders 172, 173. The cam plate 66 is provided with a slot or opening at 66ª (Figs. 1 and 28), through which the arms 175ª and folders 173 are adapted to pass. The position of the parts described is such that when turret 22 rotates to present the partially completed package in position to have the projecting ends 53ᶜ of the wrapper closed, the folders 172 and 173 will be at rest in position to permit the passage of the partially folded wrapper and the corresponding block 34 between them (Fig. 28). When the turret has come to rest the cam 171 will cause lever 165 to rock to push the retainer 162 toward the turret, and thereupon said reainer will ride up along the outer edge of block 34 and upon the wrapper 53 of the partially formed package then on said block, and will come to rest, as indicated in Figs. 30 and 31. Cam 184 then will cause arm 179 to rock to draw down bar 176 and the upper folders 172, the lower V-like edges 172$^a$ of which will engage the upper sides of the respective portions 53$^c$ of the wrapper and will fold them against the exterior articles 88, the folders 172 coming to rest substantially in the position shown in Fig. 30, leaving the under portion of the projecting parts 53$^c$ of the wrapper unfolded. Cam 184 then will cause arm 179 to rock reversely and bar 176 will rise, thereby raising the folders 172 and causing the folders 173 to rise through slot 66$^a$ of the cam plate, and the upper V-like edges 173$^a$ of folders 173 will engage and fold the lower parts of the projecting portions 53$^c$ of the wrapper against the previously folded portions, substantially to the position shown in Fig. 31, completing the folding of the ends of the wrapper, at which time the folders 173 may respectively pass in the spaces 34$^c$ between the ends of receiver 33 and the sides of block 34 (Fig. 32). While the ends of the wrapper are being folded, as stated, retainer 162 remains upon the package, and when the folders 173 have closed or folded corresponding ends of the wrapper the cam 184 will cause arm 179 again to move reversely to draw down bar 176 and the folders 173 to release the latter from the package, substantially to the position shown in Fig. 28. Thereupon cam 171 will cause lever 165 to rock the draw retainer 162 from the package, the folders 172, 173 and retainer 162 then remaining in set positions until another partly completed package has been brought to its end-folding position by the turret, the operations of folding the ends of the wrapper of such package proceeding as before described, and so on each time a wrapped series of articles is presented with respect to the folders 172 and 173.

When the packages of goods have been made, as described, they may be delivered or discharged from the turret 22 by any suitable means. For some classes of goods it is desirable to apply labels upon the packages. In the machine I have illustrated in the accompanying drawings means are provided to bodily remove from turret 22 packages of goods above described and place them successively upon labels supplied upon turret 23, and to apply paste to such labels, fold or inclose the labels around the wrappers 53 of the packages, seal the labels thereon, and discharge the labeled packages from the machine. The turret 23 is shown rotatively supported upon a bushing or bearing 28 (which may correspond to the bushing 28, Fig. 3) which bushing 28 is shown provided with arms 186 carrying a cam plate 187 below the blocks 36. Turret 23, as before described, is given step by step rotation coincident with the rotation of turret 22, whereby a block 34 of turret 22 will oppose a block 36 of turret 26 each time said turrets come to rest (Fig. 1). To retain turret 23 in set position after each step given to it by the Geneva movement 19, 20, 21, I have shown a pin or the like 188 guided in bearing 189 on frame 1, (Fig. 2) and adapted to enter holes 190 in turret 23 (Fig. 1), said holes being in relation to corresponding blocks 36, in manner described with respect to pin 80 and holes 81 of turret 23, the pin 188 being shown operative in an arcuate slot 191 in an arm 186 of cam plate 187 (Fig. 1). Pin 188 is shown pivotally connected with a crank arm 192 secured on shaft 83, whereby both pins 80 and 188 may be operated together. Blocks 36 of turret 23 are provided with seats 35 and openings 35$^a$ previously referred to, over which labels 193 are to be fed successively as the turret is stepped around (Figs. 1, 4, 16, 16$^a$, 37, 38), which may be termed the fifth operation, or the first operation regarding turret 23. The labels 193 are shown in the form of webs supported stacked in a magazine 194, which is secured to frame 1 at an appropriate stopping point of turret 23. At the lower part of the magazine is a rotative feeding support for labels, shown comprising a roller 195 (Figs. 38 and 39) having a mutilated or reduced circumferential portion 195$^a$. The forward edges of the labels rest upon feeder 195 and the rear portions rest upon a pin or pins 194$^c$ (Fig. 37) secured to the magazine. The greater diametrical portion 195$^b$ of roller 195 is shown provided with a covering, such as 196, to engage and feed the labels successively from the bottom of the stack. The covering at 196 may be of rubber, felt or the like, to suitably adhere to the labels when the roller rotates, for feeding the labels through the discharge opening 194$^a$ of the magazine into a guide or chute 197 projecting from the magazine over the blocks 36 as they are successively brought to rest by turret 23 (Figs. 37 and 38). At 198 is a stop on each of the blocks 36 in position to be engaged by the successive labels as they are fed from the magazine, to position the labels over the corresponding seats 35 of blocks 36. At 199 is indicated a retainer, one for each of the blocks 36, and pivotally supported on the corresponding block at 200 (Figs. 16 and 37), adapted to bear upon the adjacent end of a label 193 after it is fed against stop 198 from the magazine. The retainer 199 may be substantially similar to retainer 67. A stop 201 is shown in the form of a headed pin secured to each block 36 and received in a hole in retainer 199, a spring 202 bearing against the head of said stop and against the retainer serving to press the latter down to clamp the adjacent end of the label against block 36. A headed pin 203, (similar to pin 71 of turret 22) is slidably supported in a hole in each block 36 beneath the corresponding retainer 199 and is adapted to raise said retainer. A cam 204, secured upon cam plate 187 (Figs. 1 and 37), is adapted to encounter pin 203 to raise it to cause the corresponding retainer 199 to rise as the corresponding block 36 approaches the label receiving position, and when cam plate 187 is next operated, after the label has been fed beneath the retainer 199, the pin 203 is released to permit the retainer to descend and grip the adjacent end of such label. Means illustrated to feed the labels to blocks 36 successively from the magazine are as follows: Upon the shaft 205 of label feeder 195 is secured a gear 206 (Figs. 1, 4, 37, 38 and 39) in mesh with gear 207 carried by shaft 208, suitably journaled upon the lower end of the magazine, or upon the support for the latter, a sprocket wheel 209 being secured upon said shaft. A chain 210 passes over said sprocket and over a sprocket wheel 211, shown secured upon shaft 10. The arrangement described is such that as shaft 10 communicates motion to shaft 208 the latter and the gearing described will rotate the label feeding roller 195 in the direction of the arrow thereon in Fig. 37, and during the portion of the rotation of said feeder the lowermost label in the stack of labels will be fed to the opposing block 36 while the turret is at rest, and while the turret is making a step the reduced or mutilated part of the feeder will not feed a label, but the stack of labels will descend. The side of the magazine adjacent to the label delivery portion is cut away at 194$^d$ and the corresponding side of guide or chute 197 is cut away at 197$^a$ (Fig. 38), whereby when a label is gripped against block 36 by retainer 199 the label may be carried laterally with the block through said side openings 194$^d$ and 197$^a$. The cam plate 187 may be rocked or reciprocated in any suitable manner, and I have shown means for rocking or reciprocating said cam plate in consonance with the reciprocations of cam plate 66, for which purpose I have shown a rod 212, pivotally connected at 213 with cam plate 66 and pivotally connected at 214 with cam plate 187 (Figs. 1, 2 and 4).

After the labels have been fed upon the respective blocks 36 of turret 23 paste may be applied on a desired portion of the labels before the packages, previously described, are deposited on the labels, which may be termed the sixth operation, or the second operation regarding turret 23. Since the labels project from the outer upper edges 36$^a$ of the respective blocks 36 I provide a guide 215 (Figs. 1 and 37), secured upon the main frame 1 in position to support the projecting ends of the labels as they are carried around by the turret toward the paste receiving position. At a suitable distance from the label supplying devices before described, as adjacent to the next stopping point of the succeeding blocks 36 of turret 23, I provide means to apply paste upon the outer end portions of the labels, which may be described as follows: A paste pot 216 (Figs. 1, 4, 40 and 41), secured upon frame 1 outside of turret 23, is shown provided with a roller 217 adapted to dip into the paste, which roller is supported by a shaft 218, shown journaled upon the paste pot. I have shown means for rotating said roller intermittently, for which purpose a ratchet wheel 219 is secured upon shaft 218, and an arm 220 is hung upon said shaft and provided with a spring pressed pawl 221 adapted to engage said ratchet wheel, said arm being shown pivotally connected by a rod 222 with crank arm 223 secured upon shaft 224 journaled in bearings upon a support 225 on frame 1. A crank arm 226 secured to said shaft is shown pivotally connected with a rod 227 depending through a slot 228 of the frame, which rod is operated in any suitable manner by a cam 229 secured upon shaft 10, (Fig. 4). By the means described, as cam 229 rotates, the roller 217 will be rotated to carry paste on its surface from the pot. At 230 is a pad or support shown located in position approximating the end of guide 215, to receive upon said pad the projecting end portions of the labels 193 as the latter slide along and from said guide and are brought to rest by the turret 23 opposing roller 217, (Figs. 40 and 41). The pad 230 is shown carried by a rock arm 231 secured upon a shaft 232 journaled upon the bracket 233, extending from the paste pot, said shaft being shown provided with a projection or arm 234 (Figs. 1, 40 and 41). A stop 235 on bracket 233 (Fig. 40) is adapted to engage arm 231 to limit the downward movement of pad or support 230. At 236 is shown a paster, which may be of rubber or in brush-like form, adapted to engage roller 217 to receive paste therefrom and to be moved into engagement with the end portions of labels successively to apply paste thereto. I have shown paster 236 carried by bar 237 projecting from an arm 238 that is pivotally supported at 239 upon a rock arm 240 shown journaled at 241 upon support 225 The outer end of arm 238 is shown pivotally connected at 242 to a rock arm 243 secured upon shaft 224. Arm 238 is shown provided with a downward projection 244 adapted to engage projection or arm 234, when the paster is lowered toward a label, to cause the pad or support 230 to rise toward the label. When a label is brought to rest with its outer end over pad 230 the arm 243 will be moved to the right to carry arms 240, 238 and paster 236 from the dotted position (Fig. 40) in the direction of the label. The rotation of arm 240, then effected by such operation of arm 243, will cause the paster to rise from roller 217 and to be carried over into contact with the projecting end of the label, and, as the paster descends approximately to the label, the projection 244 will engage projection or arm 234 to tilt pad or support 230 upwardly, whereby the end of the label will be caused to slide slightly under the paster to wipe the paste on the upper surface of the end portion of the label. Arm 243 then will be moved reversely thereby drawing back arm 238 and causing arm 240 to swing reversely, whereby the paster will be lifted from the label and again deposited upon the roller to receive paste therefrom. The different lengths of arms 240 and 243 and the eccentric disposition of shafts 241 and 224 with relation to each other, cause the up and down and the to and fro movements of the paster, from the pasting roller 217 to the label, and back again to the pasting roller, each time arm 243 is rocked.

When the label has been pasted the turret carrying such label is stepped around to a position to receive the package 88$^a$ of wrapped articles 88 from turret 22. The arrangement set forth is such that said turrets will come to rest with a package of wrapped articles in a receiver or seat 33 of a block 34 opposing a pasted label on a block 36, substantially as illustrated in Fig. 1. I provide means to grasp the packages 88$^a$ successively as brought to rest opposite the pasted labels, and to carry the said packages bodily and deposit them upon the labels, the packages pushing the labels into the seats 35 substantially as indicated in Fig. 16, which may be termed the seventh operation, or the third operation regarding turret 23. For such purpose I have illustrated lifters or grippers and means for operating them substantially as before described with respect to lifters or grippers 114. I have shown spaced lifters 245 provided adjacent their ends with pads 246 to straddle and grip the ends of the packages, which lifters are slidably mounted upon a shaft 247 journaled in bearings 248 on the main frame (Figs. 1, 2 and 4), whereby the lifters may be rocked. The hubs of lifters 245 are provided with grooves 249 receiving projections 250, 251, respectively extending from crank arms 252, 253, in manner substantially similar to that described with respect to crank arms 128 and 129. Said crank arms 252, 253 are movably connected together by pin and slot connection at 254 (Fig. 1), and said crank arms are pivotally supported at 255 upon the main frame (Figs. 1 and 2). A rod or link 256, pivotally connected with one of said crank arms and pivotally connected with an arm 257 on shaft 137, causes said crank arms to rock to cause the lifters 245 to approach the packages 88$^a$ and recede from the same in a manner substantially similar to that described with respect to lifters 114. The lifters 245 are rocked by means of a gear 258 secured on shaft 247 and actuated by a rack 259, which may be guided in a bearing on the main frame, which rack is connected with link 260 pivotally attached to crank 261, secured upon shaft 123 (Figs. 1, 2 and 4). When the turrets come to rest with two receivers opposing on the respective turrets, shafts 123 and 137 will cause operation of the lifters 245 to grasp the package 88$^a$ upon turret 22, to lift the package to carry it over and deposit it upon a pasted label on a block 36 of turret 23, at substantially the same time that said shafts cause lifters 114 to grasp a series of articles 88 in chute 109 and deposit them upon a wrapper on block 34 of turret 22, the lifters 245 returning to grasp another package next presented to such lifters by turret 22 substantially at the time the lifters 114 return for a new supply of articles 88 in chute 109, and so on successively. After the package from turret 22 has been deposited upon a receiver of turret 23 a cam 143$^a$ on cam plate 66 operates finger 141 to move it away from the corresponding receiver 33, as to the dotted position in Fig. 15. Just before package 88$^a$ is deposited upon a pasted label 193 (Fig. 16) retainer 199 is to be operated to release the label. For such purpose cam plate 187 is shown provided with a cam 262 (Figs. 1 and 16) adapted, when said cam plate is shifted in the direction of the arrow $d$ in Fig. 1, to cause pin 203 to raise retainer 199 from the label, permitting the latter to be pushed by the package into receiver 35. At 263 is a rocking finger (Figs. 16 and 18) for each of the blocks 36, that is shown carried by a shaft 264 journaled upon said block below receiver 35, and shown provided with a projection or roller 265 adapted to be engaged by a cam 266 (Figs. 1 and 16) carried by cam plate 187. Normally the finger 263 will swing back away from receiver 35 beneath the label on block 36. After the package 88$^a$ has been deposited upon the label in said receiver, and when cam plate 187 is moved in the direction of the arrow $d$ in Fig. 1, the cam 266 will engage projection 265 and rock the finger 263 to cause it to push the adjacent portion 193$^a$ of the label partially around the package. To complete the folding and retention of portion 193$^a$ of label 193 around the package, ready for the pasted portion 193$^b$ of the label to be folded over said portion 193$^a$, I provide relatively narrow fingers 267, shown carried by a rocking arm 268 pivotally supported at 269 on block 36, a similar arm being carried upon each block 36 (Figs. 1, 16, 16ª and 18). The arm 268 is shown connected by a spring 270 with block 36 (Fig. 16), whereby the arm and the fingers 267 may be held normally retracted from the package. At 271 is a cam carried by cam plate 187 in position to engage the lower projection or roller 272 (Fig. 16) of arm 268 when said cam plate is moved in the direction of the arrow $d$ in Fig. 1, to cause the fingers 267 to advance to and hold down the projecting portion 193ª of the label ready for the other projecting portion 193ᵇ to be rolled down and pasted on the portion 193ª. I provide a folder 273, shown in the form of a roller, journaled between spaced arms 274 that are pivotally carried at 275 upon arms 276 secured upon shaft 277 that is journaled upon projections 36ᵇ of block 36, of turret 23, (Figs. 1, 16 and 16ª). The folder or roller 273 is shown resting upon and adapted to roll along the outer downwardly inclined edge 36ᶜ of block 36 in position to move up against projecting portion 193ᵇ of the label to fold or roll the latter over the package and apply the pasted portion of the label upon the portion 193ª thereof. The shaft 277 is shown provided with a projection or roller 278 adapted to engage a suitably shaped cam 279, secured upon the top of the main frame (Figs. 1, 16 and 16ª) while the turret 23 is moved away from the package receiving position. The arrangement of the parts is such that after a package has been deposited upon a label on a block 36 of turret 23, and the cam plate 187 is operated, the cam 266 will cause the finger 263 to fold the portion 193ª of the label around the package, and then the fingers 267 will advance and retain the portion 93ª of the label upon the package. The cam 271 will retain the fingers 267 temporarily upon the label, and when projection 278 encounters cam 279, during the movement of turret 23, arms 276 will be rocked to cause the roller 273 to roll up on and fold the portion 193ᵇ of the label over its other folded portion 193ª. Just about as the pasted portion of the label begins to bear upon the end portion 193ª of the label the fingers 267 will recede. The position of roller 273 upon the pasted end portion of the label on the package is indicated in dotted lines in Fig. 18, and the roller will remain in such position temporarily, serving to retain the pasted portions of the label together for sealing purposes.

After the turret next has made a series of steps the roller 273 will be withdrawn from the label and the labeled package will be presented in position for delivery from the machine. Before the wrapped and labeled package is brought to rest by the turret at the package delivering position a cam 280, shown carried by frame 1 (Fig. 1), will engage the projection 278 (which then extends in an outward direction from the turret), and restore said projection substantially to the position shown in Fig. 16, the arms 276 thereby being tilted to cause roller 273 to roll away from the package, in position to be again advanced over another package by cam 279 in manner before described.

Located adjacent to the delivery point of the packages on turret 23 I provide means to pick up the labeled packages and deliver them successively from the machine, which may be termed the eighth operation, or the fourth operation with regard to turret 23. A pair of spaced lifters or grippers 281 are slidably supported upon a rock shaft 282 journaled upon brackets or the like 283 carried by frame 1, outside of the turret, in manner substantially the same as that described with respect to the lifters 114 and 245. The hubs of said lifters are provided with grooves 284 receiving projections 285 extending from crank arms 286, 287, which crank arms are pivotally connected at 288, which may be by means of a pin and slot connection corresponding to that shown at 132, 133, in Fig. 20, one of which crank arms is pivotally connected by a link or rod 289 with a crank arm 290 secured on shaft 137, whereby as said crank arm is rocked the lifters 281 will be moved toward and away from each other to grasp and release a package. The shaft 282 may be polygonal to slidably receive and to rotate lifters 281 in manner described with respect to shaft 116 of lifters 114. The lifters 281 may have pads 292 to grip the ends of the packages 88ª. The shaft 282 may be rocked by means of a gear 293 secured thereon and in mesh with a rack 294 guided to reciprocate in guide 295 secured upon the main frame (Figs. 1 and 2), which rack is pivotally connected by a link or rod 296 with a crank arm 297 carried by shaft 123, whereby the lifters 281 may be rocked back and forth. When a package is brought to rest opposite the lifters 281 the latter, while spread apart by the action of the crank arms 286, 287, will be rotated by the aforesaid rack and gear to bring their pads opposite the package on the adjacent block 36, and thereupon the said lifters will move toward the package to grip the same, and shaft 282 will be rotated reversely to carry the lifters with the package away from the turret to deposit the package upon a receiving guide or way 298 (Figs. 4 and 6), and thereupon the arms 286, 287 will be actuated to cause lifters 281 to spread apart and release the package. Corresponding operations will be performed for each package delivered by the turret to the lifters 281. After the lifters 281 have removed a package from the receiver, the cam plate 187 will operate and cause a cam 311 thereon to engage the projection 265 of finger 263 to cause the latter to be tilted away from the receiver, in manner described with respect to finger 141.

I have shown means for delivering the labeled packages carefully along the guide 298 whence the packages may be received by any suitable means. Said guide is shown carried by a projection 299 extending from the main frame (Figs. 4 and 6) guide 298 being shown downwardly inclined. Above the guide is an endless belt 300, shown mounted upon rollers 301 and 302 journaled upon supports 303 and 304 upon support 299. The shaft of roller 301 is shown provided with a pulley 305 receiving a belt 306 from a pulley 307 secured upon shaft 10. The belt 306 is shown guided by pulleys 308, 309, journaled upon frame 1. As the packages are delivered upon guide 298 they will be fed under belt 300 and propelled thereby along the guide without injury to the package. The propelling of the package between the belt and guide has the advantageous effect of rolling the wrappers tightly and smoothly upon the articles therein resulting in the delivery of a compact package having the foil and wrapper well glued and tightened thereon, the rolling of the package aiding in causing the setting of the glue between the layers of the wrapper, and shortening of the foil to tighten it.

While I have shown the turrets each provided with eight receivers for wrappers, labels and goods, spaced equi-distantly apart, the operations occurring at five stopping points of turret 22, and at four stopping points of turret 23, no operation occurring at other stopping points of the respective turrets, (the Geneva movement causing said turrets to make eight steps or stops for each complete rotation of the turret), it will be understood that the arrangement set forth is adopted as a matter of convenience and for timing of the parts. The turrets, however, may be provided with any desired number of receivers and stopping points adapted to carry out the objects of my invention, and in accordance with the character of the goods to be packed, and the character of the packages of goods to be made. In accordance with the example illustrated, tracing a wrapper and label for example, when the wrapper is being fed and applied over a receiver of turret 22 a label is being supplied over a receiver of turret 23. For the next step of the turrets no operation is performed with regard to said wrapper, but paste is applied to a label on turret 23. At the next stop of the turrets the supply of articles for a package is deposited upon the aforesaid wrapper. (At such times labels are being successively applied on receivers on turret 23). Upon the next stop of the turrets the wrapper 53 is wrapped around the articles 88 by the folder 144. When the turrets next come to rest the projecting end portions 53$^c$ of wrapper 53 are folded or closed over the articles 88 with regard to turret 22. Upon the next step of the turrets no operations occur. Upon the succeeding step of the turrets said wrapped articles will be brought to the transferring position opposite lifters 245, a pasted label having been brought by turret 23 opposite lifters 245. The lifters 245 will next operate to deliver a wrapped series of articles from turret 22 to said pasted label on turret 23, and when the turrets next move said label will be folded around said articles. During the next three steps of the turrets no operations occur with regard to the said labeled package, and when the latter reaches the cam 280 the retainer will be moved from said label, and when turret 23 stops the lifters 281 will remove the wrapped labeled package from turret 23 and deposit it on guide 298 to be rolled and removed by belt 300.

Since the several operations with regard to each turret occur in proper order respecting receivers of the turrets as presented with respect to succeeding operating devices, it will be understood that after a completed package has once been brought to delivery position (Fig. 1) a complete labeled package will be delivered from the machine upon each stop of the turrets, it being understood that lifters 114 apply articles 88 upon a wrapper on turret 22, lifters 245 apply wrapped articles from turret 22 upon a label on turret 23, and lifters 281 remove a labeled package from turret 23, substantially simultaneously.

In this specification and the appended claims I use the term "web" in a generic sense to include the wrapper or the label, or both, as suitable pieces of flexible material, such as metal-foil, paper or the like, adapted to be folded around or upon the articles to form the packages thereof, it being understood that the articles may be inclosed in webs which provide the wrappers only, or in the wrappers having an outer printed label, or in a printed web which may serve the purpose of a wrapper and label for some classes of goods.

While I have illustrated and described my improvements as comprising two turrets and devices associated therewith for supplying and wrapping the articles on one turret, and for applying labels on the wrapped articles on the other turret, it will be understood that turret 22 and the devices associated therewith may be utilized for supplying and inclosing articles in webs, such as wrappers and delivering them without applying labels thereon, and also that turret 23 and the devices associated therewith may be utilized for applying webs, such as labels, to packages that are supplied by other means than those set forth with respect to turret 22, and for delivering such labeled packages.

Having now described my invention what I claim is:—

1. The combination of a turret having a receiver, means to apply webs successively to the receiver, retaining means for the webs, means to operate said retaining means to retain and release the webs, and means to deposit articles on the webs and push the latter into the receiver.

2. The combination of a turret having a receiver, means to apply webs successively to the receiver, a retainer movably supported by the turret to retain the webs over the receiver, means to move the retainer toward the webs, means to move the retainer away from the webs, and means to deposit articles on the webs and push the latter into the receiver.

3. The combination of a turret having a receiver, means to apply webs successively to the receiver, a retainer movably supported by the turret to retain the webs on the receiver, a spring to push the retainer toward the webs, a cam, means interposed between the cam and retainer for operating the latter to release the webs, and means to deposit articles on the webs and push the latter into the receiver.

4. The combination of a turret having a receiver, means to apply webs successively to the receiver, a retainer movably supported by the turret to retain the webs on the receiver, a spring to push the retainer toward the webs, a pin to operate the retainer, a support for the pin, a cam plate having a cam operative with the pin to move the retainer to release the webs, and means to operate the cam plate.

5. The combination of a turret having a receiver, means to feed a strip for webs to the receiver, cutting means adjacent to the turret to sever the strip for webs, a retainer to retain the webs on the receiver, a cam plate having a cam to cause the retainer to hold the webs, said cam plate having a cam to actuate the cutting means to sever webs from the strip, and means to operate the turret and the cam plate.

6. The combination of a turret having a receiver, means to supply a strip for webs, means to feed the strip step by step to present its end portion to the receiver, cutting means for the strip, means to retain severed portions of the strip on the receiver, a cam plate having a cam to operate the retaining means and having a cam to actuate the cutting means, means to operate the cam plate, and means to operate said feeding means for each operation of the turret.

7. The combination of a turret having a receiver, means to supply a strip for webs, a drum to advance the strip to present its end portion to the receiver, means to rotate the drum step by step and correspondingly feed the strip, a movable cutter for the strip, means to retain severed portions of the strip on the receiver, a cam plate having a cam to operate the retaining means and a cam to operate the movable cutter, and means to actuate the cam plate to cause operation of the movable cutter to sever webs from the strip and to cause the retaining means to retain the cut-off web.

8. The combination of means to retain wrappers and articles thereon with portions of the wrappers projecting from the articles, with a folder adapted to engage said wrapper portions, a guide for the folder, a cam coöperative with the folder to cause movement of the latter while it is being moved with the guide, and means to actuate the cam to move the folder additional to its movement by the cam when traveling thereon.

9. The combination of means to retain wrappers and articles thereon with portions of the wrappers projecting from the articles, with a folder adapted to engage said wrapper portions, a guide, a rod carrying the folder and guided by the guide, means to movably support the guide, means to reciprocate the guide to move the rod and folder laterally, and a cam coöperative with the rod to move the latter longitudinally during its movement by the guide.

10. The combination of means to retain wrappers and articles thereon with portions of the wrappers projecting from the articles, with a folder adapted to engage said wrapper portions, a guide, a rod carrying the folder and guided by the guide, means to movably support the guide, means to reciprocate the guide to move the rod and folder laterally, a cam coöperative with the rod to move the latter longitudinally during its movement by the guide, and means to actuate the cam to move the rod and folder independently of their movement when the rod travels along the cam.

11. The combination of means to retain wrappers and articles thereon, means to fold the wrappers around the articles with end portions of the wrappers projecting beyond the articles, a retainer, an arm carrying said retainer, means to guide the retainer to said wrapped articles, a lever carrying the arm, means to operate the lever to apply the retainer to and remove it from the wrapped articles, spaced folders to fold projecting end portions of the wrapper, and means to operate said folders while the retainer is upon the wrapped articles.

12. The combination of a turret having a receiver, means to retain and release webs on the receiver, a finger carried by the turret to fold a portion of the webs over articles thereon, means to operate the finger, a folder carried by the turret, and means to cause said folder to fold another portion of the webs over said articles.

13. The combination of a turret having a receiver, means to retain and release webs on the receiver, a finger carried by the turret to fold a portion of the webs over articles thereon, means to operate the finger, a folder carried by the turret, means to operate the turret step by step, and a cam to operate said folder as the turret moves.

14. The combination of a turret having a receiver, means to retain and release webs on the receiver, means to fold one portion of the webs over articles thereon, a folder carried by the turret, and means to cause said folder to fold another portion of the webs over said articles.

15. The combination of a turret having a receiver, means to retain and release webs on the receiver, a finger carried by the turret to fold a portion of the webs over articles thereon, means to operate the finger, a second finger carried by the turret, means normally retracting the second finger from the webs, means to operate the second finger to retain folded webs on said articles, a folder carried by the turret, means to cause said folder to fold another portion of the webs over said articles, and means to retract the second finger from the webs when the folder approaches said finger.

16. The combination of a turret having a receiver, means to retain and release webs on the receiver, a finger carried by the turret to fold a portion of the webs over articles thereon, a cam plate having a cam to operate said finger, a second finger carried by the turret, means normally retracting the second finger from the webs, a cam upon the cam plate to operate the second finger to retain folded webs on said articles and release the finger therefrom, a folder carried by the turret, and means to cause said folder to fold another portion of the webs over said articles.

17. The combination of a turret having spaced receivers, means to apply webs to said receivers, means to retain and release webs on said receivers, pasting devices spaced from said web applying means comprising means to apply paste to successive webs, means spaced from the pasting means to deposit articles on the pasted webs, said receivers having means to fold a portion of the webs over the articles, said receivers carrying folders for the webs, means to cause the folders to fold another portion of the webs over said articles thereon, and means to operate the turret step by step to stop the receivers successively opposite the web supplying, pasting and article depositing means.

18. The combination of a turret having spaced receivers, means to apply webs to said receivers, means to retain and release webs on said receivers, pasting devices spaced from said web applying means comprising means to apply paste to successive webs, means spaced from the pasting means to deposit articles on the pasted webs, said receivers each having a finger to fold a portion of the webs over said articles thereon, a cam plate having a cam to operate said fingers, means to actuate the cam plate, said receivers carrying folders for the webs, means to cause the folders to fold another portion of the webs over said articles thereon, and means to operate the turret step by step to stop the receivers successively opposite the web applying, pasting and article depositing means.

19. The combination of means to assemble articles in alinement, means to inclose such assembled articles in a web to form a package, and means to finally roll the package and deliver it.

20. The combination of means to assemble articles in alinement, means to inclose such assembled articles in a web, means to close the ends of said web against the corresponding ends of the assembled articles to form a package, and means to finally roll the package and deliver it.

21. The combination of means to assemble atricles, means to wrap a web around the articles, means to inclose said wrapped articles in an outer wrapper, and means to finally roll the wrapped articles to tighten the package.

22. The combination of means to assemble articles, means to wrap foil around the articles, means to wrap and glue a label around the foil to form a package and means to finally roll and deliver the wrapped articles.

23. The method of forming packages containing several articles consisting in assembling a plurality of articles in alinement, inclosing the articles in a web, applying a wrapper around said web, and rolling the package so formed to tighten the web and wrapper thereon.

Signed at New York city, in the county of New York, and State of New York, this 16th day of May, A. D. 1917.

ERNEST D. ANDERSON.

Witnesses:
T. F. BOURNE,
MARIE F. WAINRIGHT.